US010286556B2

(12) United States Patent
Troy et al.

(10) Patent No.: US 10,286,556 B2
(45) Date of Patent: May 14, 2019

(54) METHOD AND APPARATUS FOR COMPLIANT ROBOTIC END-EFFECTOR

(71) Applicant: The Boeing Company, Chicago, IL (US)

(72) Inventors: James J. Troy, Issaquah, WA (US); Daniel J. Wright, Mercer Island, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 15/294,757

(22) Filed: Oct. 16, 2016

(65) Prior Publication Data
US 2018/0104820 A1 Apr. 19, 2018

(51) Int. Cl.
G01C 21/00 (2006.01)
B25J 9/16 (2006.01)
B25J 17/02 (2006.01)
G01B 5/06 (2006.01)
G01B 3/20 (2006.01)
G01B 3/28 (2006.01)

(52) U.S. Cl.
CPC ......... B25J 9/1692 (2013.01); B25J 17/0208 (2013.01); B25J 17/0233 (2013.01); B25J 17/0275 (2013.01); G01B 3/20 (2013.01); G01B 3/28 (2013.01); G01B 5/06 (2013.01)

(58) Field of Classification Search
CPC .. B25J 9/1692; B25J 17/0275; B25J 17/0208; B25J 17/0233; G01B 5/06
See application file for complete search history.

(56) References Cited

U.S. PATENT DOCUMENTS

| 4,571,148 A | 2/1986 | Drazan |
| 5,095,638 A | 3/1992 | David et al. |
| 5,400,244 A * | 3/1995 | Watanabe ............ G05D 1/0242 180/404 |
| 5,959,211 A | 9/1999 | Wagner et al. |
| 7,393,325 B2 * | 7/2008 | Barthe ................... A61N 7/022 600/437 |
| 7,707,735 B2 | 5/2010 | Wong et al. |

(Continued)

FOREIGN PATENT DOCUMENTS

| EP | 0103603 A1 | 3/1984 |
| EP | 0683017 A1 | 11/1995 |

(Continued)

OTHER PUBLICATIONS

Partial European Search Report, dated Mar. 16, 2018, regarding Application No. EP17196698.9, 11 pages.

(Continued)

Primary Examiner — Ian Jen
(74) Attorney, Agent, or Firm — Yee & Associates, P.C.

(57) ABSTRACT

A method and apparatus for performing an operation on a workpiece using a multi-axis compliant end-effector for attachment to a robotic device. The end-effector is positioned at a nominal location of a workpiece feature on which the operation is to be performed. The end-effector is passively aligned with the workpiece feature by contacting the end-effector with the workpiece feature. The operation is performed on the workpiece feature in response to aligning the end effector with the workpiece feature.

27 Claims, 28 Drawing Sheets

(56) References Cited

U.S. PATENT DOCUMENTS

| | | | | |
|---|---|---|---|---|
| 9,848,904 B2* | 12/2017 | Aljuri | | A61B 34/10 |
| 2004/0164697 A1* | 8/2004 | Iribe | | B25J 13/085 |
| | | | | 318/568.12 |
| 2006/0083599 A1 | 4/2006 | Hoeckelman | | |
| 2006/0106495 A1* | 5/2006 | Takenaka | | B62D 57/032 |
| | | | | 700/253 |
| 2008/0267450 A1* | 10/2008 | Sugimoto | | A63H 17/395 |
| | | | | 382/103 |
| 2010/0001616 A1* | 1/2010 | Ferreira | | H02N 1/008 |
| | | | | 310/300 |
| 2011/0270443 A1* | 11/2011 | Kamiya | | G05B 19/401 |
| | | | | 700/245 |
| 2011/0270444 A1* | 11/2011 | Nagata | | B25J 9/1633 |
| | | | | 700/258 |
| 2012/0259463 A1* | 10/2012 | Orita | | B25J 9/1648 |
| | | | | 700/245 |
| 2013/0089235 A1* | 4/2013 | Yoon | | G06K 9/00664 |
| | | | | 382/103 |
| 2014/0210796 A1* | 7/2014 | Nikolovski | | G06F 3/0436 |
| | | | | 345/177 |
| 2014/0235267 A1* | 8/2014 | Song | | G05D 1/0253 |
| | | | | 455/456.1 |
| 2015/0314445 A1* | 11/2015 | Naitou | | B25J 9/1674 |
| | | | | 700/258 |
| 2016/0176052 A1* | 6/2016 | Yamamoto | | B25J 9/1676 |
| | | | | 700/255 |
| 2016/0243700 A1* | 8/2016 | Naitou | | B25J 9/1633 |
| 2017/0113349 A1* | 4/2017 | Naitou | | B25J 9/1674 |

FOREIGN PATENT DOCUMENTS

| | | |
|---|---|---|
| EP | 2541190 A1 | 1/2013 |
| GB | 2218963 A | 11/1989 |

OTHER PUBLICATIONS

Extended European Search Report, dated Feb. 12, 2019, regarding Application No. EP17196698.9, 12 pages.

* cited by examiner

METHOD AND APPARATUS FOR COMPLIANT ROBOTIC END-EFFECTOR

BACKGROUND INFORMATION

1. Field

The present disclosure relates generally to robotic manufacturing operations, and in particular, to positioning an end-effector attached to a robotic arm for manufacturing applications. Still more particularly, the present disclosure relates to a method and apparatus for accurately positioning a robotic end-effector on workpieces having variances in the target locations.

2. Background

In manufacturing applications involving control of robotic arm devices, it is necessary to precisely position the robot manipulator or end effector with respect to the workpiece on which any operations are to be performed. Many applications that use robotic arm devices assume a deterministic approach to position and orientation control for the robot. This deterministic approach expects the robotic workcell conditions to be constant and the motion control of the robot will always produce the same results for every new workpiece.

However, for some applications, especially those involving large parts, deterministic assumptions about constant workcell and workpiece conditions usually is not valid. For example, changing environmental conditions, such as thermal expansion and/or contraction of a workpiece, often results in variances in the target locations on a workpiece. For these robotics applications in which the target locations on a workpiece may vary, achieving accurate end-effector alignment with workpiece features is difficult.

In situations where an operation needs to precisely align the end-effector with a feature on the workpiece, such as inserting a tool into a hole for measurement types of tasks, incorrect placement of the end-effector may cause damage to the end-effector, the workpiece, or both. When incorrect placement of the end-effector occurs, any automated task being executed by the robot must be stopped. A human operator is often needed need to intervene to address the problem.

In standard robotic control applications involving accurate end-effector positioning near a workpiece feature, a misalignment would require an operator to stop the robot control program to perform workpiece or robot location adjustments, then restart the control program. Although this interrupt, adjust, and restart approach involving human intervention will allow the task to be completed, it is very inefficient.

In more adaptive applications, vision systems have been used to address misalignment problems. Vision systems typically involve moving the end-effector with an attached camera to the feature location. The camera takes a picture of the area of interest. A control system identifies the correct feature in the image, and computes a local offset needed to move the end-effector to the correct location. The robot then moves the end-effector to the correct location by executing another robot move.

Vision systems can work well on a workpiece with a consistent surface appearance and under tightly controlled lighting conditions. However, vision systems can also be expensive and difficult to integrate into existing robotic systems. Furthermore, vision systems often require a significant amount of initial and on-going calibration, as well as specialized maintenance.

External camera systems are another type of existing solution. External camera systems use one or more external cameras or other sensors located in the environment, instead of on the robot itself. In external camera system type applications, the relative position and orientation of the end-effector relative to the feature is measured. However, similar to other vision systems, external camera systems are highly dependent upon a consistent surface appearance and under tightly controlled lighting conditions.

Optical motion capture systems are a variation on the external camera system described above. Optical motion capture systems utilize retro-reflective markers placed on the end-effector and workpiece. The retro-reflective markers overcome some of the lighting issues of other camera systems, such that optical motion capture systems are not as dependent on surface appearance or ambient lighting conditions. However, as with other types of vision-based systems, Optical motion capture systems have initial calibration and specialized maintenance issues, and are typically very expensive.

Specialized Coordinate Measuring Machines (CMMs) are gantry-type devices used for a variety of measurement tasks. However, CMMs are typically large, heavy devices with limited work volumes. It would be difficult and time consuming to use a CMM for operations on large or complex workpieces.

Therefore, it would be desirable to have a method and apparatus that take into account at least some of the issues discussed above, as well as other possible issues.

SUMMARY

In one illustrative embodiment, an apparatus comprises a multi-axis compliant end-effector for attachment to a robotic device. The end-effector comprises a compliant contact probe. The compliant contact probe is configured to determine by contact an actual location of a workpiece feature. The end-effector additionally comprises at least one translational joint and at least one rotational joint associated with the compliant contact probe. The at least one translational joint and at least one rotational joint are configured to passively align the compliant contact probe with the workpiece feature.

In another illustrative embodiment, a method is provided for automatically performing an operation on a workpiece using a multi-axis compliant end-effector for attachment to a robotic device. The method comprises positioning the end-effector at a nominal location of a workpiece feature on which the operation is to be performed. The method additionally comprises contacting the end-effector with the workpiece feature to passively align the end-effector with the workpiece feature. The method additionally comprises performing the operation on the workpiece feature in response to aligning the end effector with the workpiece feature.

In yet another illustrative embodiment, a computer program product is provided for automatically performing an operation on a workpiece using a multi-axis compliant end-effector for attachment to a robotic device. The computer program product comprises a computer readable storage media. The computer program product comprises first program code, stored on the computer readable storage media, for positioning the end-effector at a nominal location of a workpiece feature on which the operation is to be performed. The computer program product additionally comprises second program code, stored on the computer readable storage media, for contacting the end-effector with the workpiece feature to passively align the end-effector with the workpiece feature. The computer program product additionally comprises third program code, stored on the computer readable storage media, for performing the operation on the workpiece feature in response to aligning the end effector with the workpiece feature.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
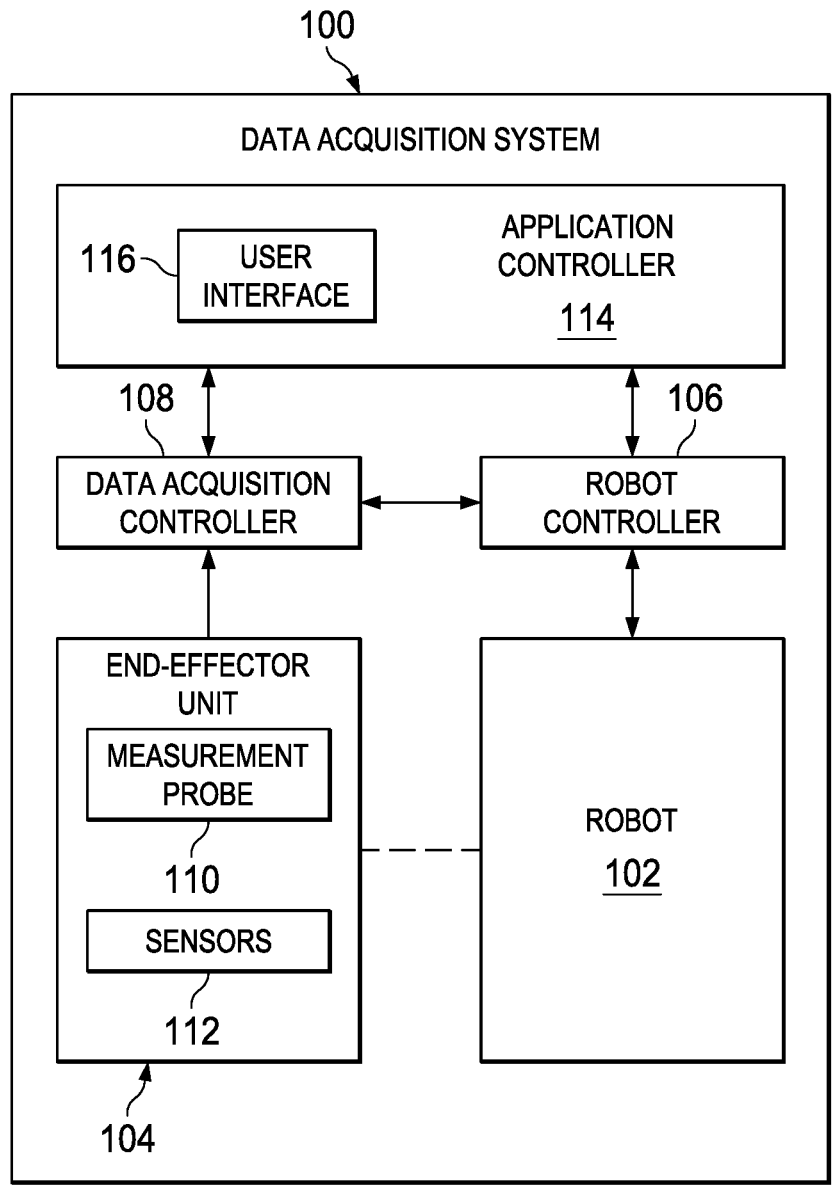
FIG. 1 is an illustration of a data acquisition system depicted in the form of a block diagram in accordance with an illustrative embodiment.

The illustrative embodiments take into account different considerations. For example, the illustrative embodiments take into account that it may be desirable to perform manufacturing applications involving a robot operator. Furthermore, the illustrative embodiments take into account that it may be desirable to have a method and apparatus for to precisely positioning the robot with respect to a workpiece, and perform manufacturing operations thereon. In particular, the illustrative embodiments take into account that it may be desirable to have a method and apparatus for precisely positioning the robot with respect to large workpieces, such as manufactured airplane components, and accurately measure hole or cutout thickness thereon.

Thus, the illustrative embodiments provide a method and apparatus that enables end-effector alignment with workpiece features in situations where potential discrepancies exist between nominal locations of workpieces and workpiece features and the actual locations of workpieces and workpiece features. This capability enables reuse of robotic path programs without having to reprogram the robot, and it is applicable to situations where alignment contact with the workpiece is permitted.

The illustrative embodiments provide a compliant, self-aligning robotic end-effector for attachment to a robot arm or gantry that allows the system to compensate for deviations of an actual feature location from the nominal value. The end-effector uses rotational and translational compliant elements to enable proper alignment with workpieces and workpiece features even when the exact location of the features is not precisely known. The end-effector accurately performs surface thickness measurements associated with holes, slots, and other types of cutouts, especially for large objects.

The end-effector of the illustrative embodiments and a control process therefore provide an alignment compensation method that allows a robotic control program developed for nominal locations of features to be tolerant of small to medium-sized deviations in workpieces and feature locations from the nominal values.

Illustrative embodiments provide an end-effector that uses a compliant design involving multiple integrated translational joints, rotational joints, and magnetic detents that allow the end-effector to passively adapt to the non-ideal conditions and still perform the programmed operation. This adaptability enables robotic applications developed for nominal feature locations to be used in situations involving moderate location discrepancies without having to reprogram the robot path, or stop a motion program to make workpiece or robot location adjustments partially through a completed program.

Illustrative embodiments provide an end-effector with compliant translational motion in three dimensions as well as pitch and roll rotation compliant motion. Of the end-effector. The multiple integrated translational joints, rotational joints, magnetic detents, and sensors enable the self-aligning feature of the end-effector, as well compensation for over-travel of the lateral motion of end-effector by the robot operator. Together these features allow the end-effector to acquire accurate hole thickness measurements even when it is misaligned.

The illustrative embodiments further provide a method for controlling the end-effector having multiple levels of error detection, as well as recovery methods for measurement applications with larger discrepancies. The error detection and recovery methods allow the system to operate with minimal human intervention. In situations with large misalignment (where probe contacts the surface during the alignment check phase instead of going into a hole) the application controller performs a search pattern to locate the hole. The application controller then provides an offset measurement to the control application to re-center the location, and then continues with the measurement process.

Referring now to the figures and, in particular, with reference to FIG. 1, an illustration of a data acquisition system is depicted in the form of a block diagram in accordance with an illustrative embodiment. In this illustrative example, data acquisition system 100 may be used to acquire information about a workpiece.

As depicted, data acquisition system 100 includes robot 102. Robot 102 may be configured to move end-effector unit 104. In particular, robot 102 may be used to position end-effector unit 104 relative to a surface of a workpiece.

In one illustrative example, robot 102 comprises an associated robotic arm. In this example, end-effector unit 104 is configured for attachment to the robotic arm associated with robot 102.

When one component is "associated" with another component, as used herein, this association is a physical association in the depicted examples. For example, a first component, such as a robotic arm, may be considered to be associated with a second component, such as robot 102, by being secured to the second component, bonded to the second component, mounted to the second component, welded to the second component, fastened to the second component, magnetically attached to the second component, and/or connected to the second component in some other suitable manner. In some cases, the first component may be considered associated with the second component by being connected to the second component by a third component. The first component also may be considered to be associated with the second component by being formed as part of and/or as an extension of the second component.

As depicted, data acquisition system 100 includes robot controller 106. Robot controller 106 may be configured to control movement of robot 102. In particular, robot controller 106 may be used to control robot 102 in order to position end-effector unit 104 relative to a surface of a workpiece.

As depicted, data acquisition system 100 includes data acquisition controller 108. Data acquisition controller 108 may be configured to control operation of end-effector unit 104. In particular, data acquisition controller 108 may be used to control operation of end-effector unit 104 in order to acquire information about a workpiece.

In one illustrative example, data acquisition controller 108 is a module for acquiring data about a workpiece. In this illustrative example, data acquisition controller 108 does not run its own control programs internally. Instead, data acquisition controller 108 provides raw input/output data to at least one of robot controller 106 or application controller 114.

In one illustrative example, data acquisition controller 108 is a module that can be controlled by, or integrated into, the robot controller 106. Therefore, data acquisition controller 108 can be a module that communicates directly with robot controller 106.

In another illustrative example, data acquisition controller 108 can be controlled by the application controller 114. Therefore, data acquisition controller 108 can be interfaced with end-effector unit 104 through application controller 114.

In this illustrative example, data acquisition system 100 includes robot controller 106, data acquisition controller 108, and application controller 114. At least one of robot controller 106, data acquisition controller 108, and application controller 114 may be implemented using software, hardware, firmware, or a combination thereof. When software is used, the operations performed by robot controller 106, data acquisition controller 108, and application controller 114 may be implemented using, for example, without limitation, program code configured to run on a processor unit. When firmware is used, the operations performed by robot controller 106 and data acquisition controller 108 may be implemented using, for example, without limitation, program code and data stored in persistent memory to run on a processor unit.

When hardware is employed, the hardware may include one or more circuits that operate to perform the operations performed by robot controller 106 and data acquisition controller 108. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or some other type of combination. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, data acquisition system 100 includes end-effector unit 104. End-effector unit 104 is configured for attachment to robot 102. In this illustrative example, end-effector unit 104 is configured for attachment to the robotic arm associated with robot 102.

End-effector unit 104 is configured to acquire information about a workpiece. The information can be, for example, information regarding a physical characteristic of the workpiece, such as a dimension of the workpiece. In an illustrative example, end-effector unit 104 is configured to measure a thickness of the workpiece.

In one illustrative example, end-effector unit 104 is passively compliant. The passive compliance of end-effector unit 104 allows end-effector unit 104 to adapt to non-ideal conditions, and still perform the programmed controls from data acquisition controller 108. The ability adapt to the non-ideal conditions allows data acquisition controller 108 to adapt robotic applications developed for nominal workpiece feature locations in a workpiece to situations involving moderate location discrepancies of the workpiece feature. The robotic applications can be adapted without having to reprogram robot controller 106 to a different path, or make workpiece or robot location adjustments partially through a completed program.

In one illustrative example, the passive compliance of end-effector unit 104 is implemented through multiple translational and rotational joints integrated into end-effector unit 104. In the illustrative example, the translational and rotational joints comprise magnetic detents and springs that allow end-effector unit 104 to passively adapt to the non-ideal conditions and still perform the programmed controls from data acquisition controller 108. While passive compliant motion is taking place, sensors 112 are used to detect or determine contact and faults, which are then communicated to robot controller 106.

End-effector unit 104 includes a number of components. As depicted, end-effector unit 104 includes measurement probe 110 and sensors 112.

Measurement probe 110 is a tool configured to acquire information about the workpiece. In one illustrative example, measurement probe 110 is an actuated linear measurement probe configured to accurately measure surface thickness of a workpiece at a specific location.

In an illustrative example, measurement probe 110 is configured to contact the workpiece. Measurement probe 110 may be contact compliant, permitting light contact with the workpiece without resulting in damage to end-effector unit 104 or the workpiece. The end-effector unit 104 is designed to articulate in response to a contact event, and then return to its original configuration once contact is removed.

Sensors 112 are configured to detect contact between measurement probe 110 and the workpiece. Detecting contact between measurement probe 110 and the workpiece enables contact alignment of measurement probe 110 with a workpiece feature. Contact alignment of measurement probe 110 enables robot 102 to adapt to the non-ideal conditions involving location discrepancies between nominal workpiece feature locations and actual workpiece feature locations without having to reprogram robot controller 106 to a different path, or make workpiece or robot location adjustments partially through a completed program.

As depicted, data acquisition system 100 includes application controller 114. In one illustrative example, application controller 114 is implemented within a computer system comprised of one computer or multiple computers that are in communication with each other. In one illustrative example, the instructions, or code, for performing the steps that are performed by application controller 114 may be stored in a memory of the computer system and implemented by one or more processors within the computer system.

In this illustrative example, application controller 114 interfaces with robot controller 106 and data acquisition controller 108. A user can interact with at least one of robot controller 106 and data acquisition controller 108 through user interface 116 of application controller 114.

The illustration of data acquisition system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, data acquisition controller 108 may be implemented as part of robot controller 106, or the application controller 114. In other cases, both the application controller 114 and the data acquisition controller 108 may be implemented as part of robot controller 106.

Figure 2:
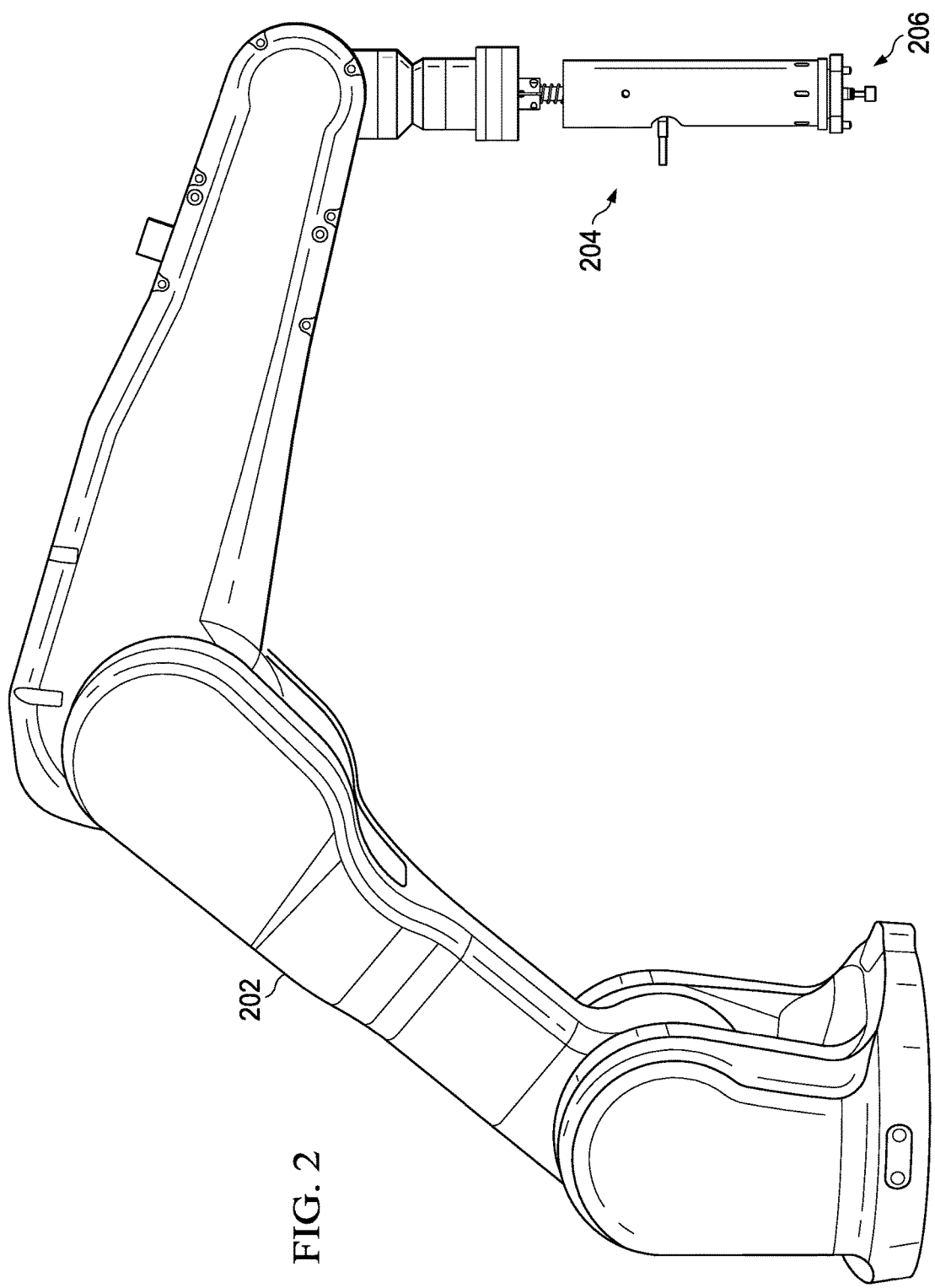
FIG. 2 is an illustration of a perspective view for a robot having an end-effector unit attached thereto depicted in accordance with an illustrative embodiment.

Turning next to FIG. 2, an illustration of a perspective view for a robot having an end-effector unit attached thereto is depicted in accordance with an illustrative embodiment. Robot 202 may be an example of a physical implementation for robot 102, shown in block form in FIG. 1.

In one illustrative example, robot 202 may be configured to move end-effector unit 204. In particular, robot 202 may be used to position end-effector unit 204 relative to a surface of a workpiece. As depicted, robot 202 comprises a robotic arm.

In this illustrative example, end-effector unit 204 is configured for attachment to robot 202. End-effector unit 204 illustrated in FIG. 2 may be an example of a physical implementation for end-effector unit 104, shown in block form in FIG. 1. End-effector unit 204 is configured to acquire information about a workpiece.

In one illustrative example, end-effector unit 204 is passively compliant. End-effector unit 204 can adapt to non-ideal conditions involving moderate location discrepancies of workpieces and workpiece features. The ability adapt to the non-ideal conditions allows end-effector unit 204 to adapt to moderate location discrepancies for workpieces and workpiece features without having to reprogram robot 202 to a different path, or make location adjustments to robot 202.

In an illustrative example, end-effector unit 204 includes measurement probe 206. Measurement probe 206 illustrated in FIG. 2 may be an example of a physical implementation for measurement probe 110, shown in block form in FIG. 1. In this illustrative example, end-effector unit 204 is configured to be contact compliant, permitting light contact with the workpiece without resulting in damage to end-effector unit 204 or the workpiece.

Measurement probe 206 is configured to contact the workpiece. In this illustrative example, measurement probe 206 is configured to be contact aligned with workpieces and workpiece features. Contact alignment of measurement probe 206 enables end-effector unit 204 to adapt to non-ideal conditions involving location discrepancies without having to reprogram robot 202.

Figure 3:
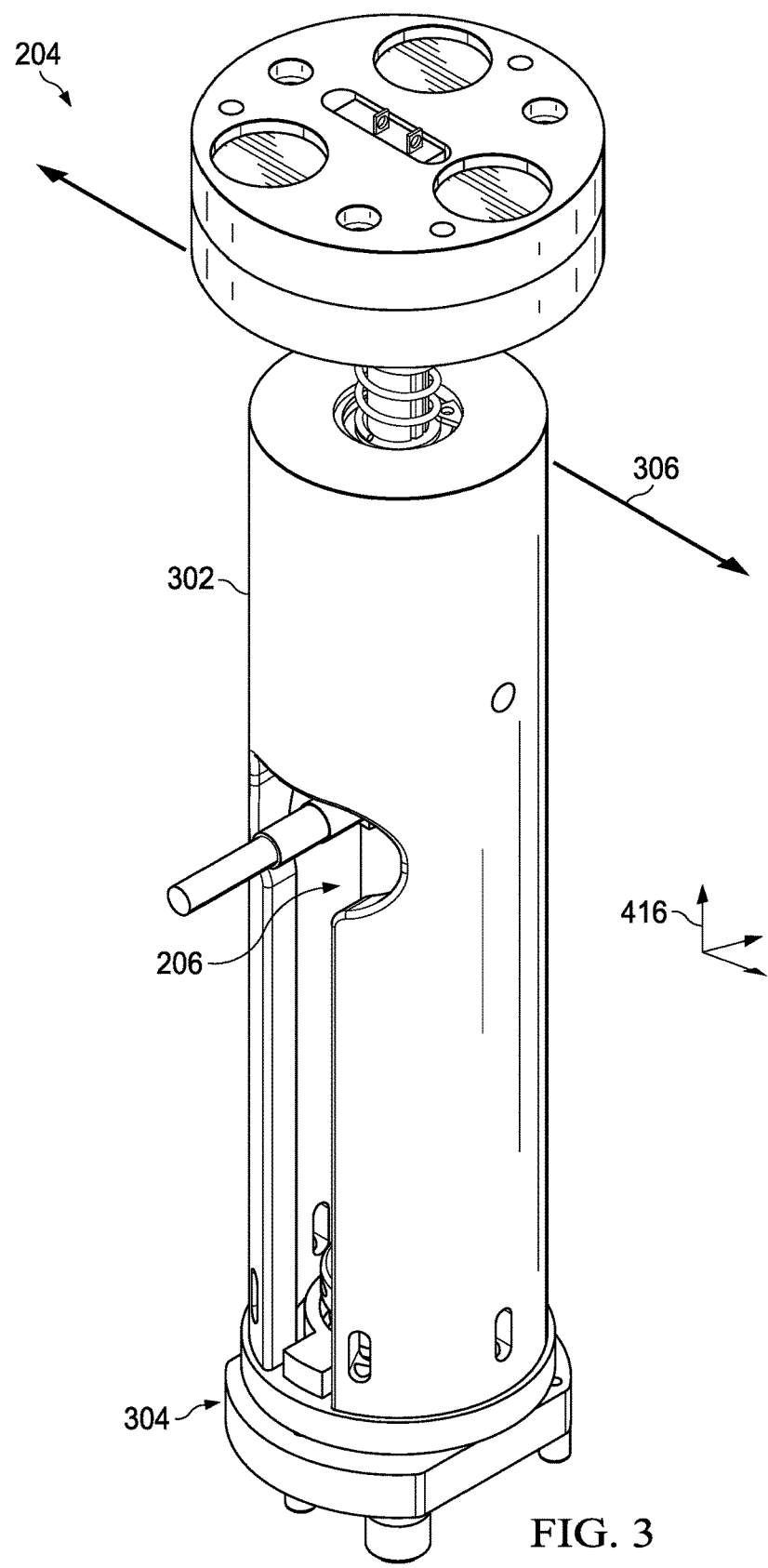
FIG. 3 is an illustration of an orthographic projection view for an end-effector unit depicted in accordance with an illustrative embodiment.

Turning next to FIG. 3, an illustration of an orthographic projection view for an end-effector unit is depicted in accordance with an illustrative embodiment. As depicted, FIG. 3 is an enlarged view of end-effector unit 204 of FIG. 2.

As depicted, end-effector unit 204 includes measurement probe 206, main body 302 and foot assembly 304. Measurement probe 206 is mounted within main body 302 and foot assembly 304. Foot assembly 304 is associated with main body 302 such that foot assembly 304 and measurement probe 206 are passively compliant, enabling end-effector unit 204 to adapt to non-ideal locations of workpiece features.

Figure 4:
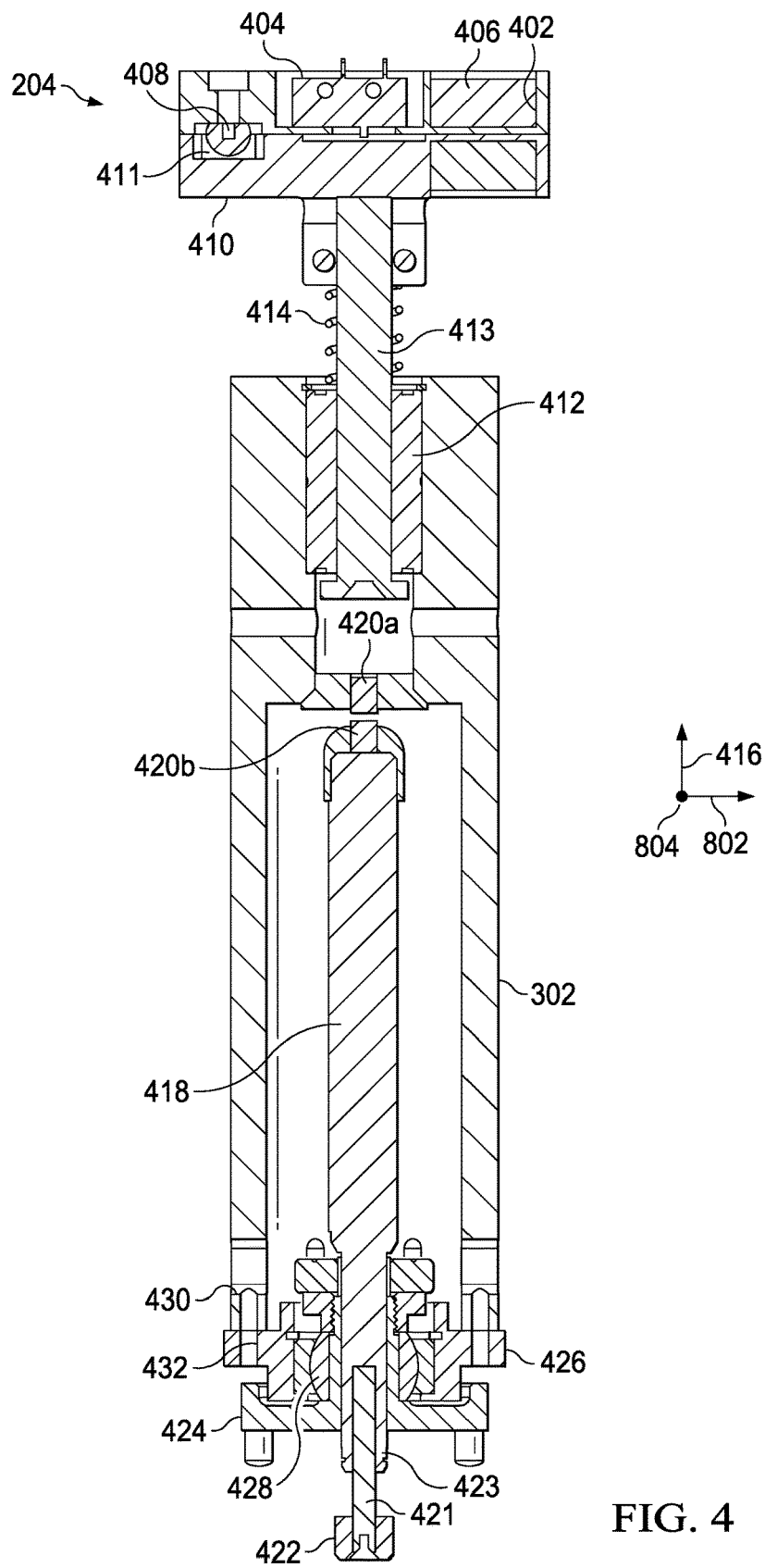
FIG. 4 is an illustration of cross-section view for end-effector unit depicted in accordance with an illustrative embodiment.

Turning next to FIG. 4, an illustration of cross-section view for end-effector unit is depicted in accordance with an illustrative embodiment. As depicted, FIG. 4 is a cross-section view of end-effector unit 204, taken along line 306 of FIG. 3.

As depicted, end-effector unit 204 includes connector plate 402. Connector plate 402 connects end-effector unit 204 to robot 202 of FIG. 2. In one illustrative example, connector plate 402 includes micro-switch breakaway 404 for detection of a disconnect between connector plate 402 and magnetic breakaway 410. In one illustrative example, micro-switch breakaway 404 activates an emergency stop condition as a safety feature in the event connector plate 402 becomes disconnected from magnetic breakaway 410.

Connector plate 402 includes embedded magnets 406 and kinematic locators 408. Embedded magnets 406 and kinematic locators 408 precisely couple magnetic breakaway 410 with respect to connector plate 402.

In one illustrative example, kinematic locators 408 are a triangular arrangement of three protrusions on connector plate 402 that correspond with indentations 411 on magnetic breakaway 410. When connector plate 402 is coupled to magnetic breakaway 410, kinematic locators 408 deterministically constrain relative motion between connector plate 402 and magnetic breakaway 410 in six degrees of freedom.

Linear slide 412 is mounted to magnetic breakaway 410 by way of spline 413. In an illustrative example, spring 414 provides compliance along z-axis 416, permitting light contact between end-effector unit 204 and a workpiece. In conjunction with other features described below, spring 414 enables passive contact alignment of measurement probe 206, allowing end-effector unit 204 to acquire accurate information for workpiece features under non-ideal conditions.

The compliant characteristics of linear slide 412 allow main body 302 to move along z-axis 416. In conjunction with other features described below, extension along z-axis 416 relative to connector plate 402 and magnetic breakaway 410, linear slide 412 enables compensation for non-ideal locations of workpieces and workpiece features. Specifically, linear slide 412 compensates, in part, for angular misalignment of workpiece features and enables accurate data acquisition by measurement probe 206.

Linear gauge 418 is magnetically coupled to linear slide 412 by alignment magnets 420a and 420b. In conjunction with other features described below, magnetically coupling to linear slide 412 allows linear gauge 418 to return to a nominal orientation after the unit has been moved away from the nominal orientation to compensate for non-ideal location of workpiece features. Specifically, the magnetic coupling between linear slide 412 and linear gauge 418 compensates, in part, for angular misalignment of workpiece features enabling alignment of measurement probe 206 with the angular misalignment of the workpiece feature. Based in part on the magnetic coupling between linear slide 412 and linear gauge 418, end-effector unit 204 can acquire accurate information for workpiece features under non-ideal conditions, and return to a neutral state when information acquisition is finished.

Linear gauge 418 is a sensor designed to measure information about a workpiece. The information can be, for example, a thickness, curvature, eccentricity, displacement, height, depth, flatness, variation, runout, roundness, distortion, deflection, or position. In an illustrative example, linear gauge 418 is configured to determine thickness of a workpiece at a workpiece feature based on a range of travel of contactor 422 along z-axis 416. When configured to determine thickness of a workpiece at a workpiece, linear gauge 418 can be, for example, an encoder-based measurement probe, a linear variable differential transformer, or other suitable types of distance measurement devices.

In an illustrative example, extension of contactor 422 is actuated by a pneumatic actuator connected to contactor 422 through extension shaft 421. In the illustrated example, the pneumatic actuator is driven by a pneumatic cylinder within measurement probe 206. Pneumatic actuation of contactor 422 provides additional compliance along z-axis 416.

In another illustrative example, extension of contactor 422 is actuated by other types of actuators, such as for example, a lead screw actuator. In this illustrative example, these other types of actuators may have their own internal spring system to provide additional compliance along z-axis 416.

The simultaneous compliance of translation along z-axis 416 as well as pitch and roll rotation enables the passive self-alignment of measurement probe 206, as well as over-travel compensation for lateral motion of end-effector unit 204. Based in part on the self-alignment of measurement probe 206, end-effector unit 204 can acquire accurate information for workpiece features under non-ideal conditions.

Foot collet 424 forms a collar around bearing housing 426. Bearing housing 426 is rotatable within foot collet 424 around spherical bearing 428, allowing for rotational movement of foot collet 424 relative to bearing housing 426 and main body 302.

Spherical bearing 428 supports linear gauge 418. spherical bearing 428 permits angular rotation of linear gauge 418 about a central point in orthogonal directions around spherical bearing 428.

Rotational compliance of measurement probe 206 about spherical bearing 428 in orthogonal directions enables the passive self-alignment of measurement probe 206. Based in part on the self-alignment of measurement probe 206, end-effector unit 204 can acquire accurate information for workpiece features under non-ideal conditions.

Bearing housing 426 is magnetically coupled to the main body 302 by alignment magnets 430 and alignment magnets 432. In conjunction with other features, alignment magnets 430 and alignment magnets 432 allows end-effector unit 204 to compensate for non-ideal location of workpiece features. Specifically, the magnetic coupling between alignment magnets 430 and alignment magnets 432 compensates, in part, for planar misalignment of workpiece features enabling planar translational alignment of measurement probe 206 with the workpiece and workpiece feature. Alignment magnets 430 interact with alignment magnets 432 of bearing housing 426, acting as magnetic detents. Based in part on the magnetic coupling between bearing housing 426 and main body 302, end-effector unit 204 can acquire accurate information for workpiece features under non-ideal conditions, and return to a neutral state on state acquisition is finished.

Barrel probe 423 is a portion of end-effector unit 204 configured to provide contact feedback during lateral motion of the end-effector 204 by robot 202. In one illustrative example, barrel probe 423 includes integrated contact sensing capability configured to send a digital signal to the robot controller 106, shown in block form in FIG. 1. The signal from barrel probe 423 indicates contact with a workpiece, and that robot controller 106 should stop motion of robot 102.

In one illustrative example, the integrated contact sensing capability of barrel probe 423 is provided by one or more contact sensors, such as sensors 112 shown in block form in FIG. 1. In this illustrative example, the integrated contact sensing capability of barrel probe 423 may be provided by contact sensors such as but not limited to, pressure-based switches, capacitive sensors, resistive sensor, and electrical connection sensors, and combinations thereof.

Figure 5:
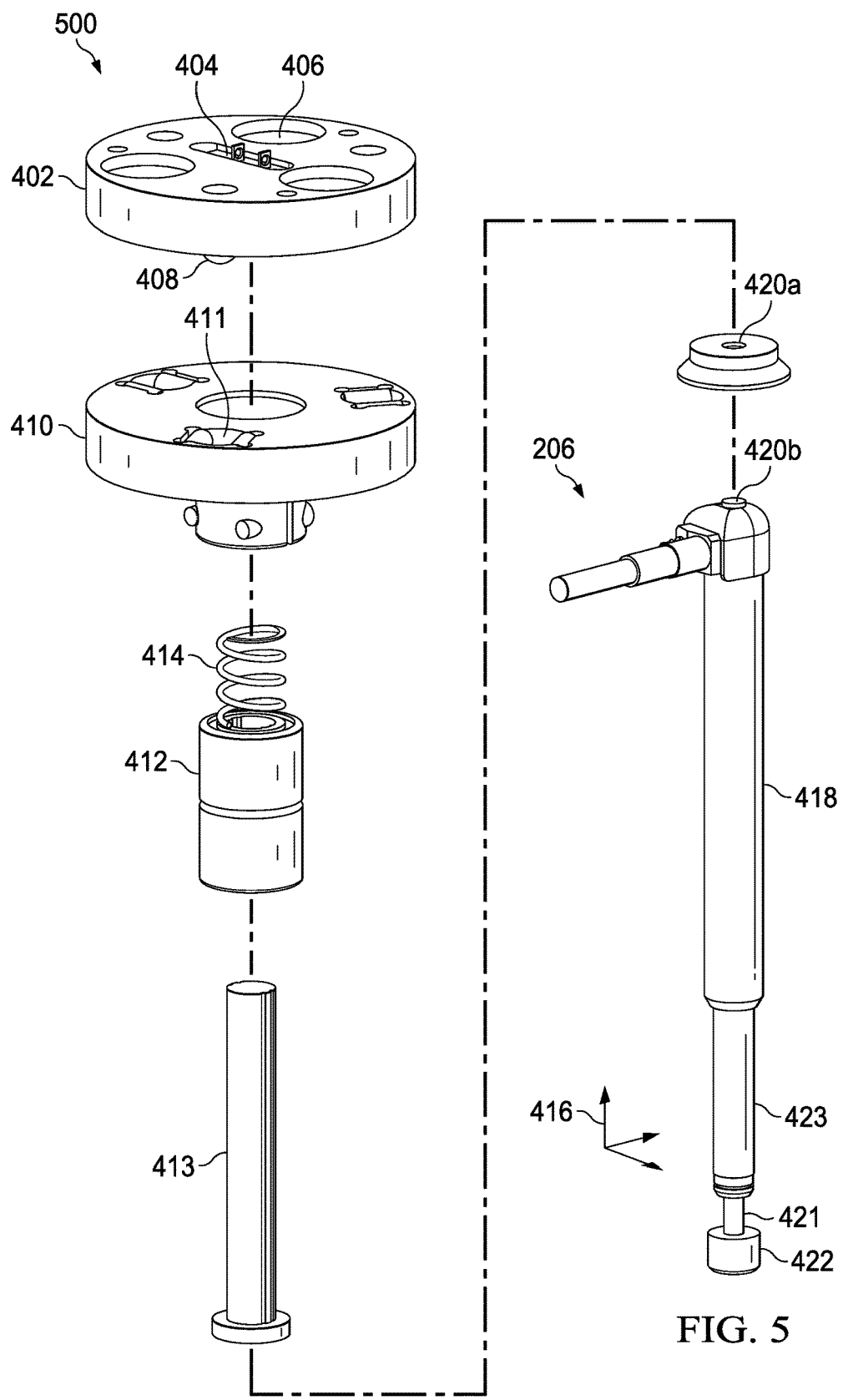
FIG. 5 is an illustration of a orthographic view for an exploded assembly portion of an end-effector unit including a measurement probe depicted in accordance with an illustrative embodiment.

Turning next to FIG. 5, an illustration of a orthographic projection view for an exploded assembly portion of an end-effector unit including a measurement probe is depicted in accordance with an illustrative embodiment. Assembly 500 illustrated in FIG. 5 is an exploded orthographic projection view of measurement probe 206, as well as other components, of end-effector unit 204 of FIG. 2.

As depicted, assembly 500 includes connector plate 402. Connector plate 402 connects end-effector unit 204 to robot 202, both shown in FIG. 1. In one illustrative example, connector plate 402 includes micro-switch breakaway 404 for removably connecting end-effector unit 204 to robot 202.

Connector plate 402 includes embedded magnets 406 and kinematic locators 408. Kinematic locators 408 correspond with indentations 411 on magnetic breakaway 410, precisely coupling magnetic breakaway 410 with respect to connector plate 402.

Linear slide 412 is mounted to magnetic breakaway 410 by way of spline 413. In an illustrative example, spring 414 provides compliance along z-axis 416, compensating, in part, for angular misalignment of workpiece features.

Linear gauge 418 is magnetically coupled to linear slide 412 by alignment magnets 420a and 420b. Alignment magnets 420a and 420b allow compensation, in part, for angular misalignment of workpieces and workpiece features, enabling passive alignment of measurement probe 206 with the angular misalignment of the workpiece feature.

Figure 6:
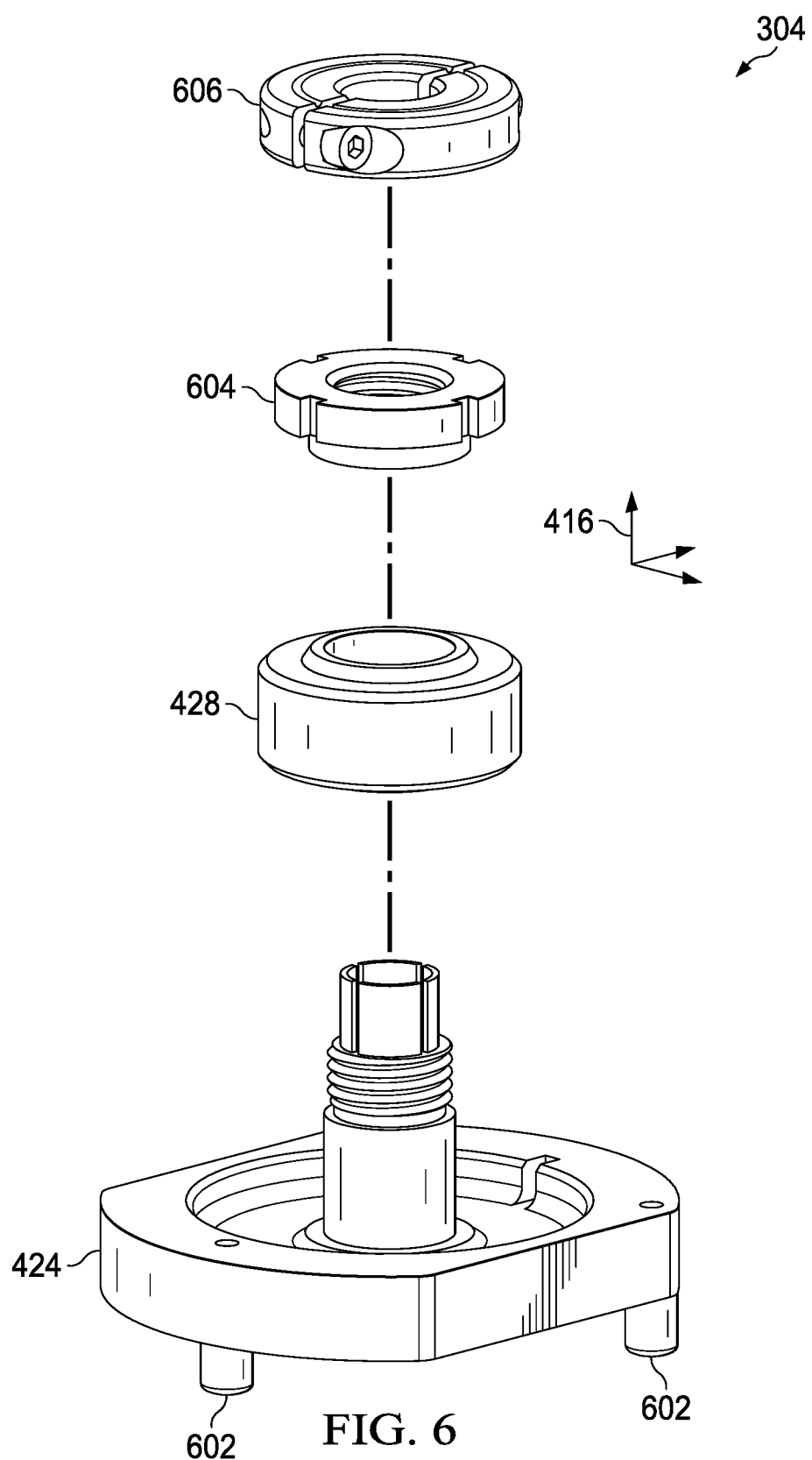
FIG. 6 is an illustration of a orthographic projection view for an exploded assembly portion of an end-effector unit including a foot depicted accordance with an illustrative embodiment.

Turning next to FIG. 6, an illustration of an orthographic projection view for an exploded assembly portion of an end-effector unit including a foot assembly is depicted in accordance with an illustrative embodiment. Foot assembly 304 illustrated in FIG. 6 is an exploded orthographic projection view of foot assembly 304, as well as other components, of end-effector unit 204 of FIG. 3.

Foot assembly 304 includes foot collet 424. Foot collet 424 forms a collar around bearing housing 426 of FIG. 4. Foot collet 424 allows bearing housing 426, shown in FIG. 8, to rotate around spherical bearing 428, allowing for rotational movement of foot collet 424 relative to bearing housing 426 and main body 302.

Foot collet 424 includes a number of contactor tips 602. Contactor tips 602 permit light contact with the workpiece without resulting in damage to end-effector unit 204 or the workpiece.

Spherical bearing 428 permits angular rotation of linear gauge 418, shown in FIG. 4, about a central point in orthogonal directions around spherical bearing 428. Spherical bearing 428 is secured to linear gauge 418 by lock nut 604. Clamp 606 secures spherical bearing 428 within bearing housing 426 of FIG. 4.

Figure 7:
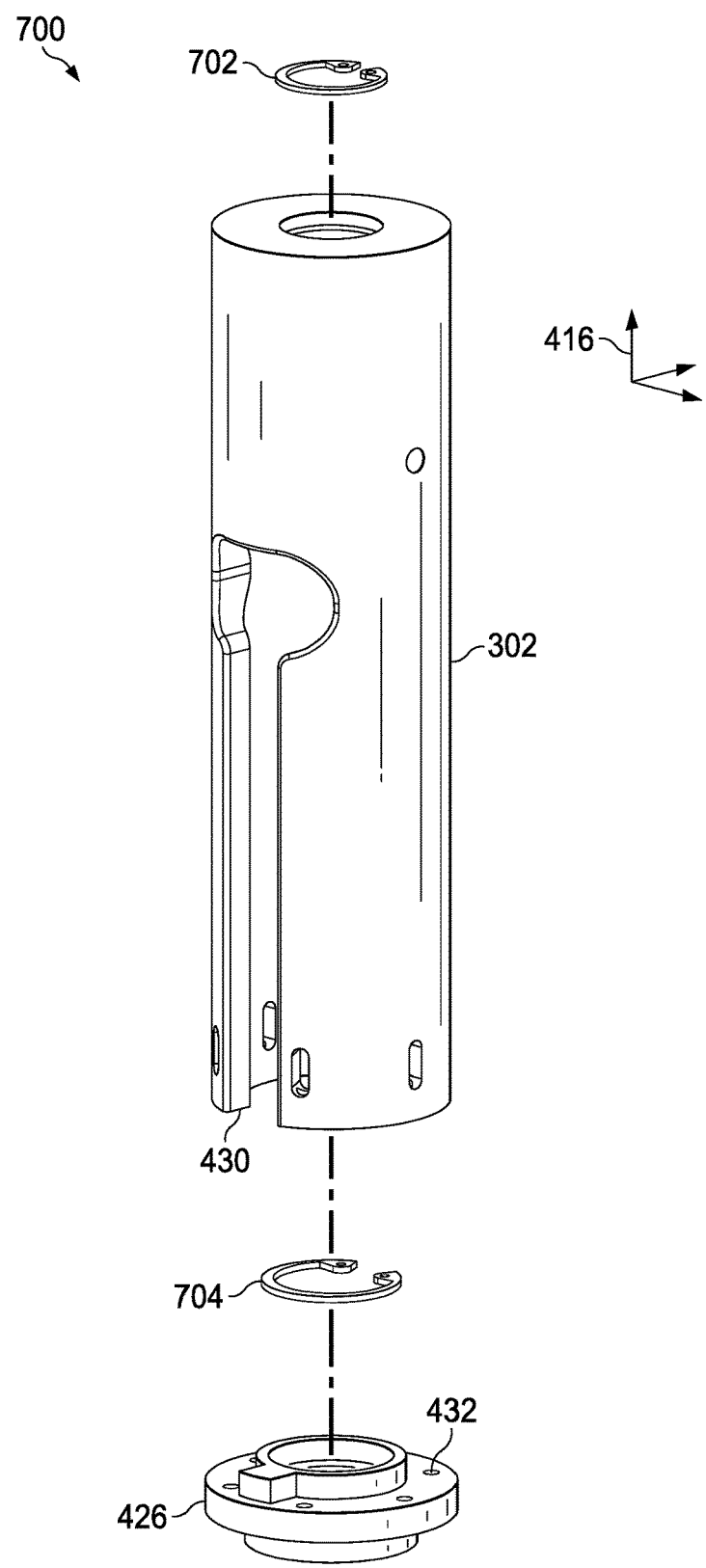
FIG. 7 is an illustration of an orthographic projection view for an exploded assembly portion of an end-effector unit including a main body depicted in accordance with an illustrative embodiment.

Turning next to FIG. 7, an illustration of a orthographic projection view for an exploded assembly portion of an end-effector unit including a main body is depicted in accordance with an illustrative embodiment. Assembly 700 illustrated in FIG. 7 is an exploded orthographic projection view of main body 302, as well as other components, of end-effector unit 204 of FIG. 3.

Main body 302 provides a protective housing for measurement probe 206 of FIG. 2, as well as support structure and connection between linear slide 412 and the spherical bearing housing 428 of FIG. 4. Main body 302 is associated with linear slide 412, shown in FIG. 4. In one illustrative example, linear slide 412 is secured within main body 302 by retaining ring 702.

Retaining ring 704 restrains spherical bearing 428 within bearing housing 426 of FIG. 4. As described in FIG. 6, clamp 606 secures spherical bearing 428, within bearing housing 426, both shown in FIG. 4.

Bearing housing 426 is magnetically coupled to the main body 302 by alignment magnets 430 and alignment magnets 432. The magnetic coupling between alignment magnets 430 and alignment magnets 432 compensates, in part, for linear misalignment of workpiece features enabling linear alignment of measurement probe 206 with the workpiece and workpiece feature.

Figure 8:
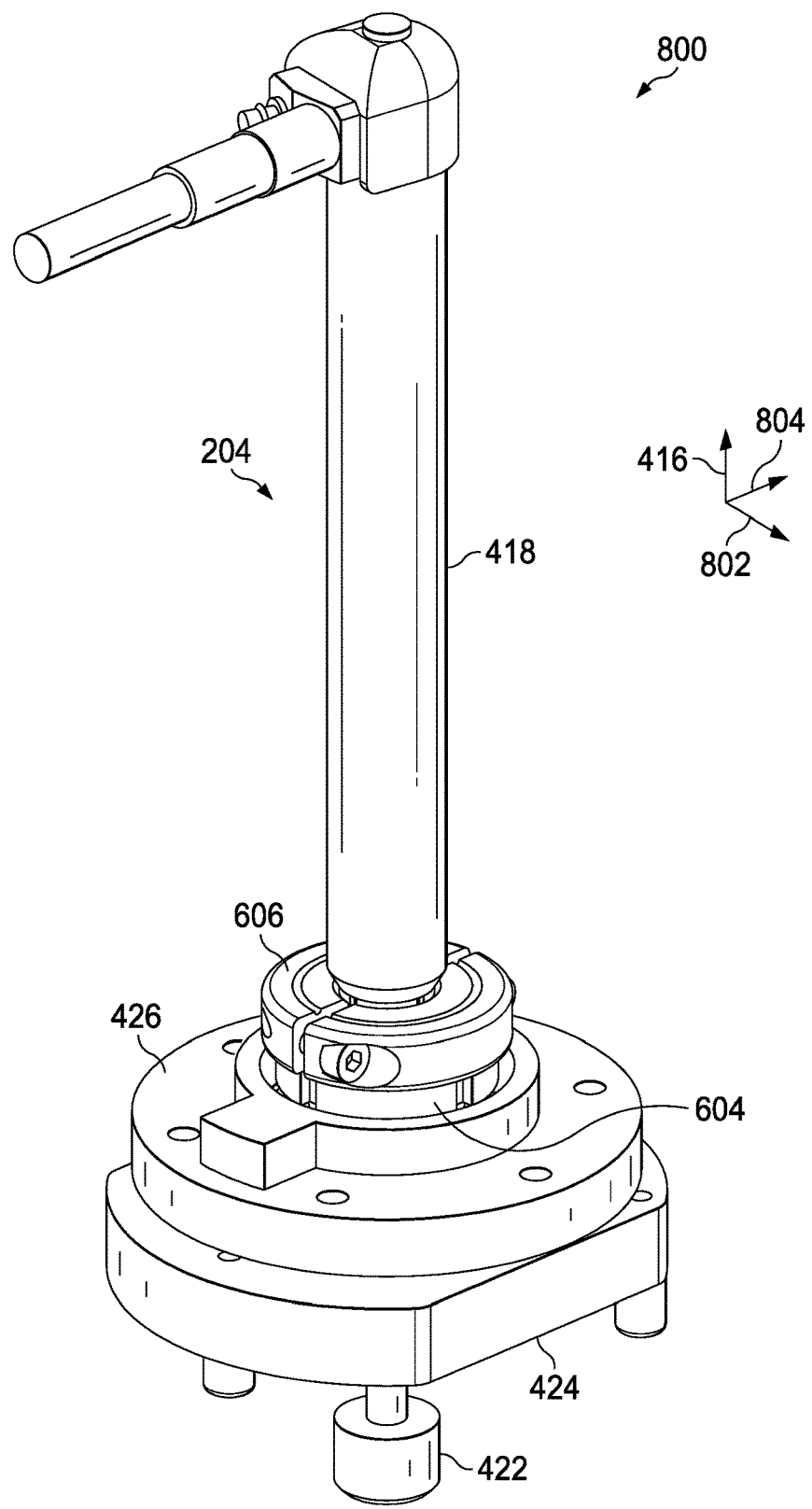
FIG. 8 is an illustration of a perspective view for an end-effector assembly depicted in accordance with an illustrative embodiment.

Turning next to FIG. 8, an illustration of a perspective view for an end-effector assembly is depicted in accordance with an illustrative embodiment. Assembly 800 illustrates portions of end-effector unit 204 having main body 302, both shown in FIG. 3, removed therefrom.

As depicted, assembly 800 illustrates linear gauge 418 and contactor 422 mounted inside spherical bearing 428. Spherical bearing 428 supports linear gauge 418, permitting angular rotation of linear gauge 418 about a central point in orthogonal directions along both x-axis 802 and y-axis 804. Clamp 606 secures lock nut 604, shown in FIG. 6, which secures spherical bearing 428 within bearing housing 426.

Foot collet 424 forms a collar around bearing housing 426. Bearing housing 426 is rotatable within foot collet 424 around spherical bearing 428, allowing for rotational movement of foot collet 424 relative to bearing housing 426.

Figure 9:
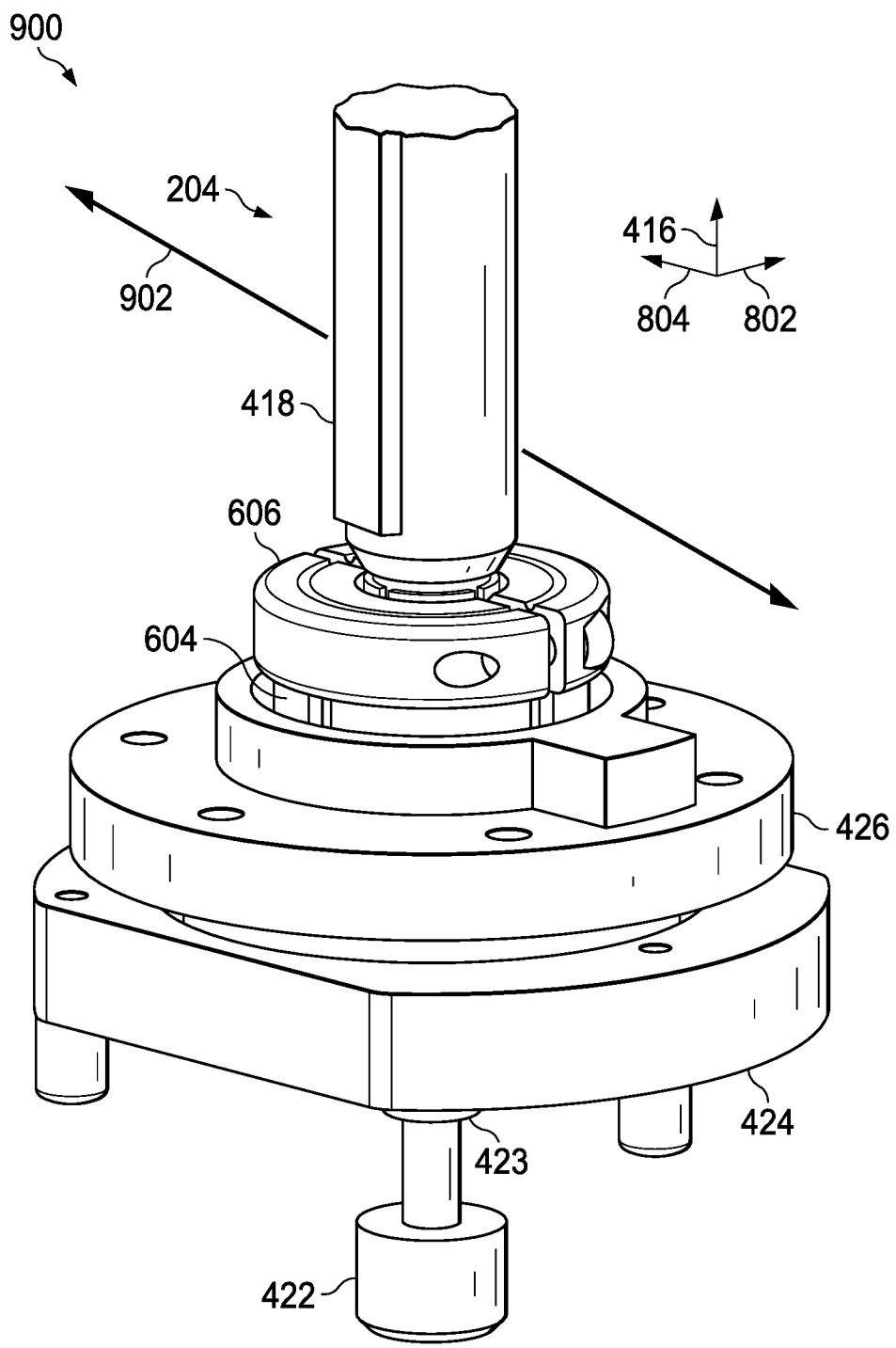
FIG. 9 is an illustration of an enlarged orthographic projection view for an end-effector assembly depicted in accordance with an illustrative embodiment.

Turning next to FIG. 9, an illustration of an enlarged orthographic projection view for an end-effector assembly is depicted in accordance with an illustrative embodiment. As depicted, assembly 900 is an enlarged orthographic projection view of the lower part of assembly 800 of FIG. 8.

Figure 10:
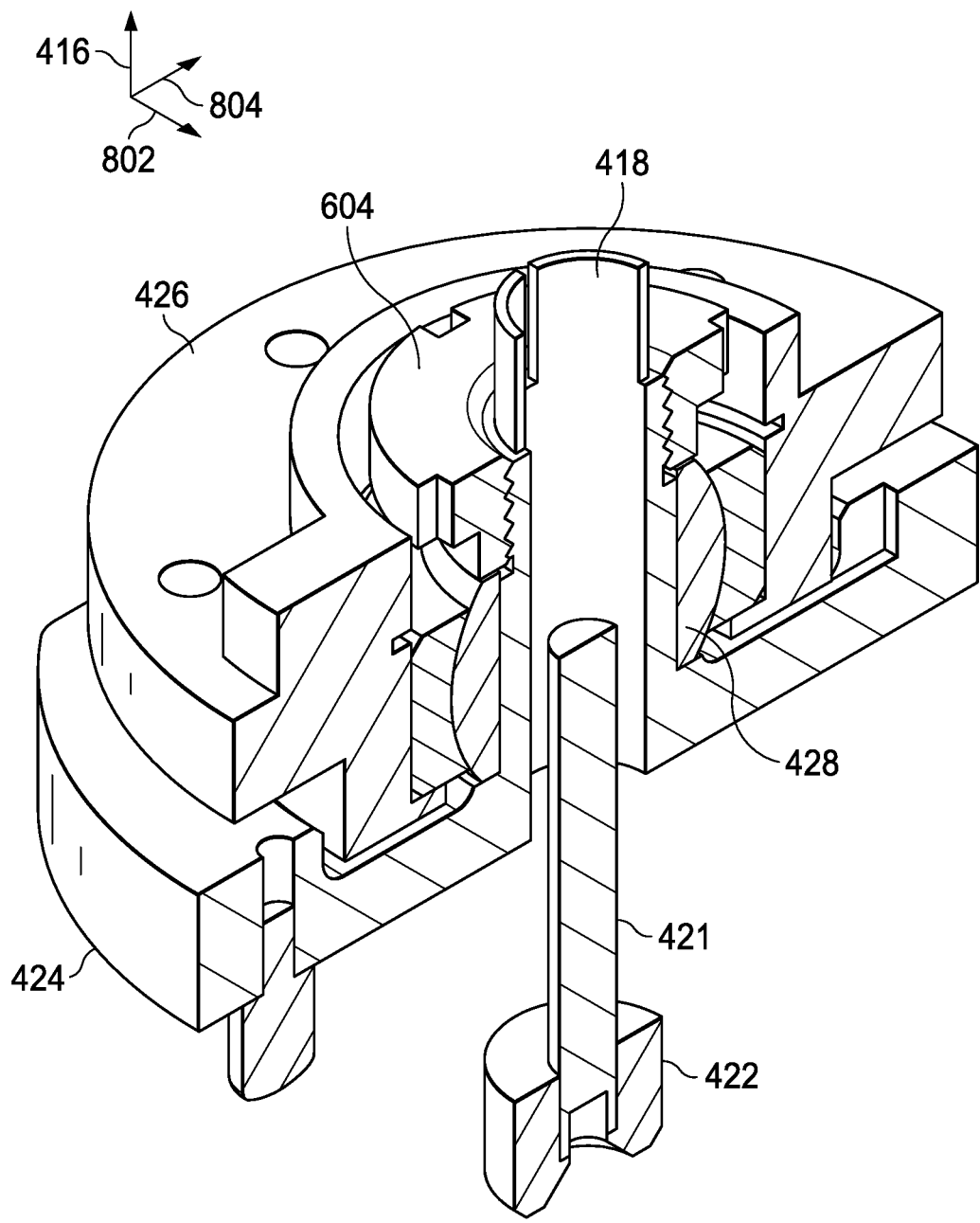
FIG. 10 is an illustration of cross-section view for an end-effector assembly unit depicted in accordance with an illustrative embodiment.

Turning next to FIG. 10, an illustration of cross-section view for an end-effector assembly unit is depicted in accordance with an illustrative embodiment. As depicted, FIG. 10 is a cross-section view of assembly 900, taken along section line 902 of FIG. 9. As depicted, contactor 422 is mounted on extension shaft 421, which slides within probe barrel 423, which passes through spherical bearing 428. Spherical bearing 428 supports linear gauge 418, permitting angular rotation of linear gauge 418 about a central point in orthogonal directions along both x-axis 802 and y-axis 804. Clamp 606 secures spherical bearing 428 within bearing housing 426.

Foot collet 424 forms a collar around bearing housing 426. Bearing housing 426 is rotatable within foot collet 424 around spherical bearing 428, allowing for rotational movement of foot collet 424 relative to bearing housing 426.

Figure 11:
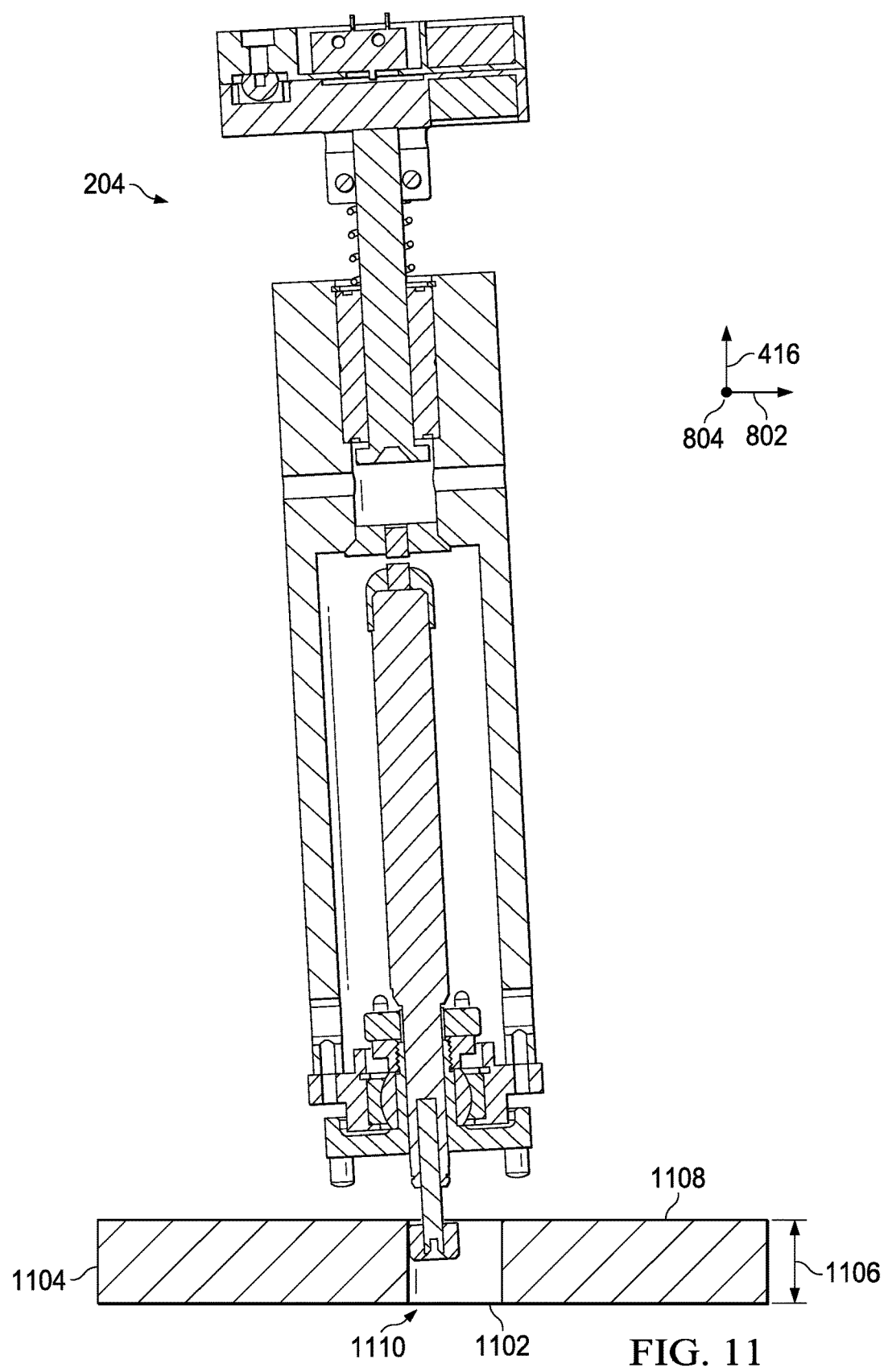
FIG. 11 is an illustration of a cross-sectional view for a passively compliant end-effector unit angularly misaligned with a workpiece depicted in accordance with an illustrative embodiment.

Turning next to FIG. 11, an illustration of a cross-sectional view for a passively compliant end-effector unit angularly misaligned with a workpiece is depicted in accordance with an illustrative embodiment. As depicted, end-effector 204 is illustrated according to the cross-section view of FIG. 4.

This illustrative embodiment, end-effector 204 is positioned to perform an operation on workpiece feature 1102 of workpiece 1104. In this illustrative example, the operation is a measurement of thickness 1106 workpiece 1104.

In this illustrative example, workpiece 1104 may be part of an aircraft. For example, without limitation, workpiece 1104 may be incorporated in at least one of a skin panel, a wing, a fuselage, a horizontal stabilizer, a door, a housing, an engine, or other suitable structures in an aircraft. Workpiece 1104 may also be a frame structure for an aircraft, such as a rib, a spar, a stringer, or other suitable frame structures in an aircraft.

Workpiece 1104 may have surface 1108. Surface 1108 may be referred to as a "work surface" in some illustrative examples. Workpiece feature 1102 of workpiece 1104 is located at actual location 1110.

In this illustrative example, workpiece feature 1102 is a feature of workpiece 1104 on which an operation is to be performed by end-effector unit 204. In this illustrative example, workpiece feature 1102 is a hole in workpiece 1104. In this illustrative example, end-effector unit 204 is configured to accurately perform a measurement operation of thickness 1106 of workpiece 1104.

End-effector unit 204 is positioned by robot 202 of FIG. 2, at a nominal location according to robot controller 106, shown in block form in FIG. 1. The nominal location corresponds to an expected location and orientation for workpiece 1104 and workpiece feature 1102 along surface 1108. The nominal location can be based on a design or manufacturing specification for workpiece 1104. The nominal location can be stored as reference data within at least one of robot controller 106 and application controller 114.

In this illustrative example, actual location 1110 of workpiece 1104 substantially angularly deviates from the nominal location at which end-effector unit 204 oriented. Under these operating conditions, end-effector unit 204 may be unable to accurately perform operations at workpiece feature 1102 due to the angular misalignment between end-effector unit 204 and workpiece 1104.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Figure 12:
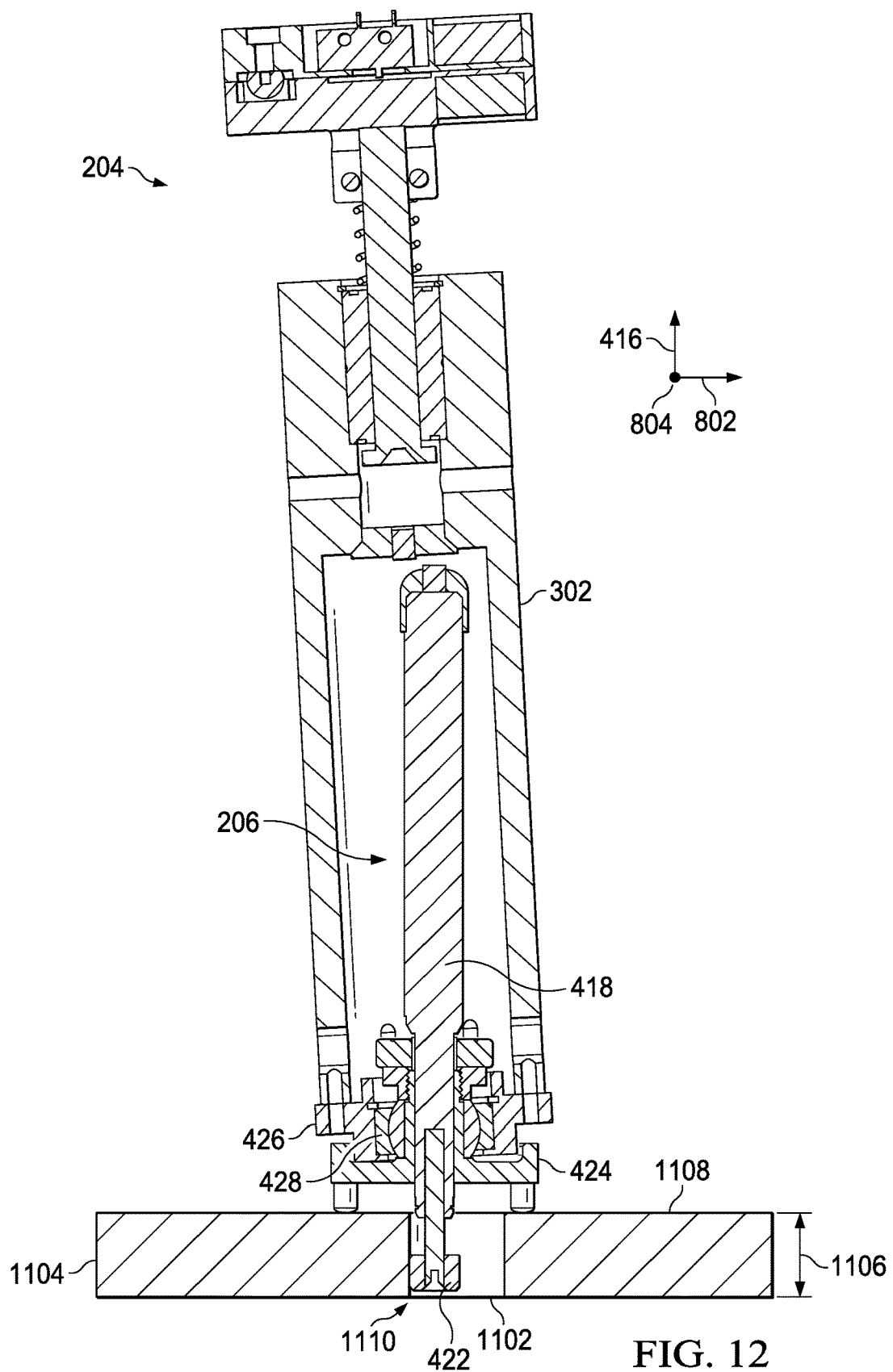
FIG. 12 is an illustration of a cross-sectional view for a passive alignment of passively compliant end-effector unit with an angularly misaligned workpiece depicted in accordance with an illustrative embodiment.

Turning next to FIG. 12, an illustration of a cross-sectional view for alignment of passively compliant end-effector unit with an angularly misaligned workpiece is depicted in accordance with an illustrative embodiment. As depicted, end-effector 204, illustrated according to the cross-section view of FIG. 4, is passively aligned with workpiece feature 1102 of FIG. 11.

Spherical bearing 428 permits angular rotation of linear gauge 418 and foot collet 424 about a central point in orthogonal directions around spherical bearing 428 relative to main body 302. As contactor 422 is inserted into workpiece feature 1102, foot collet 424 passively rotates around sperical bearing 428, allowing for rotational movement of foot collet 424 relative to bearing housing 426 and main body 302.

Linear gauge 418 of measurement probe 206 is coupled with foot collet 424. Therefore, rotation of foot collet 424 about spherical bearing 428 produces a corresponding rotation of measurement probe 206 in orthogonal directions along either of x-axis 802 and y-axis 804.

Rotational compliance of measurement probe 206 about spherical bearing 428 in orthogonal directions enables the passive angular self-alignment of end-effector unit 204. Based in part on the passive self-alignment of measurement probe 206, end-effector unit 204 can accurately perform operations on workpiece feature 1102.

Figure 13:
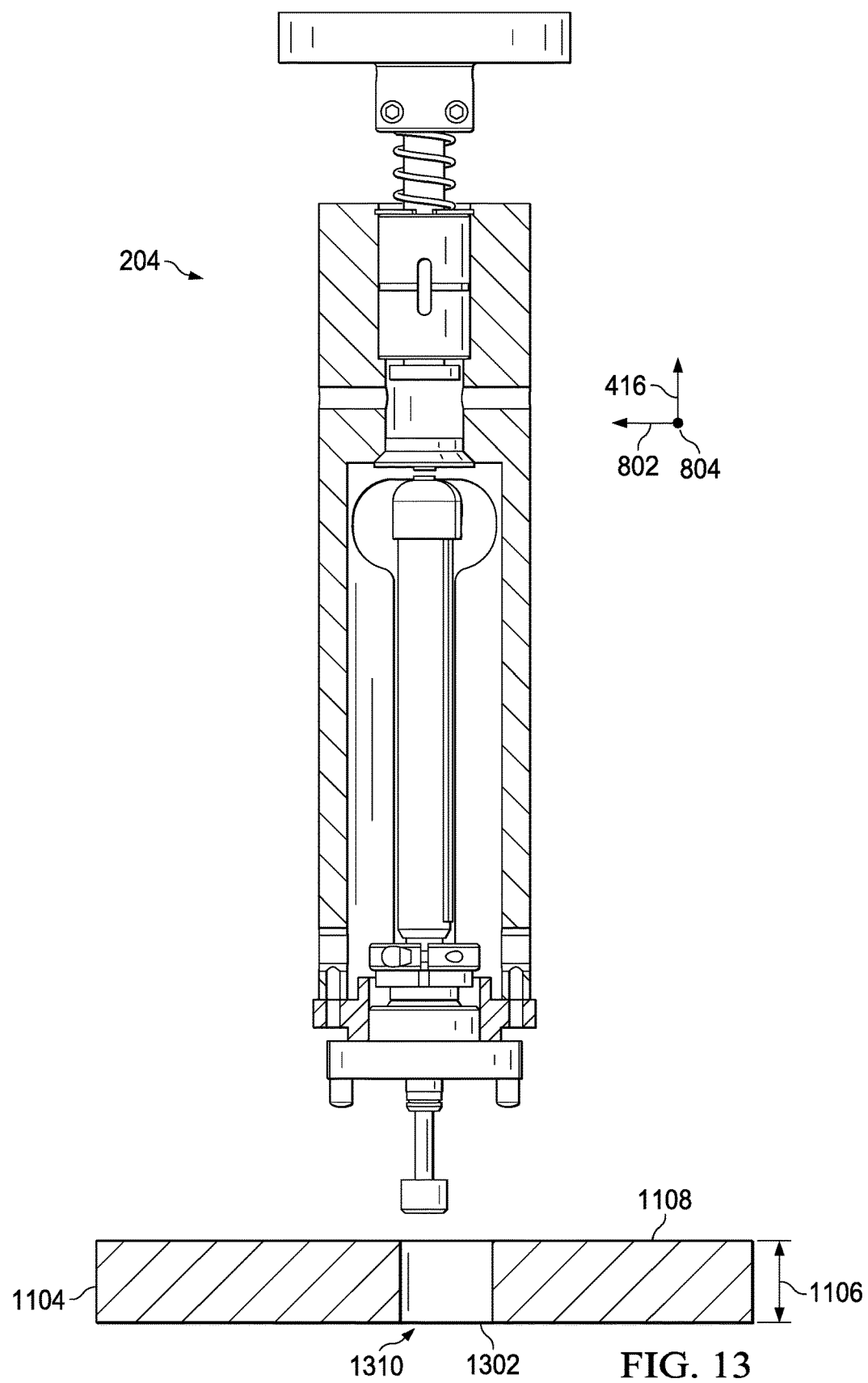
FIG. 13 is an illustration of a cross-sectional view for a passively compliant end-effector unit at a hole approach position relative to a workpiece depicted in accordance with an illustrative embodiment.

Turning next to FIG. 13, an illustration of a cross-sectional view for a passively compliant end-effector unit angularly misaligned with a workpiece is depicted in accordance with an illustrative embodiment. As depicted, end-effector 204 is illustrated according to the cross-section view of FIG. 4.

This illustrative embodiment, end-effector unit 204 is positioned to perform an operation on workpiece feature 1302 of workpiece 1104. In this illustrative example, the operation is a measurement of thickness 1106 of workpiece 1104.

End-effector unit 204 is positioned by robot 202 of FIG. 2, at a location above the nominal location of the hole by robot controller 106, shown in block form in FIG. 1. The nominal location corresponds to an expected location for workpiece 1104 and workpiece feature 1302 along surface 1108. The nominal location can be based on a design or manufacturing specification for workpiece 1104. The nominal location can be stored as reference data within at least one of robot controller 106 and application controller 114. In this illustrative example, the nominal location is an expected location, including three-dimensional position and angular orientation, for a center of workpiece feature 1102

In this illustrative example, actual location 1310 of workpiece 1104 substantially linearly deviates from the nominal location at which end-effector unit 204 is located. Under these operating conditions, end-effector unit 204 may be unable to accurately perform operations at workpiece feature 1302 due to the linear misalignment between end-effector unit 204 and workpiece feature 1302.

Figure 14:
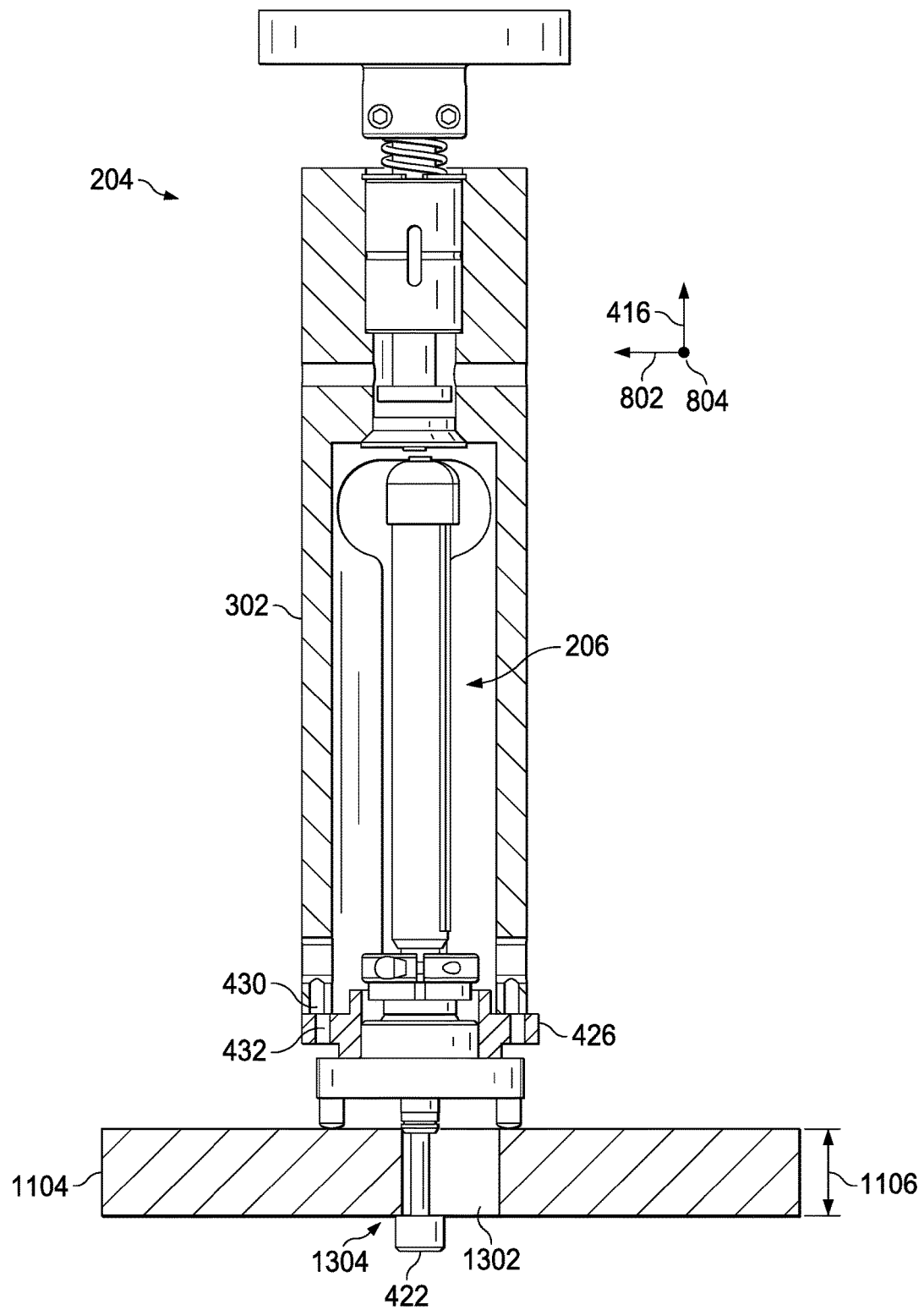
FIG. 14 is an illustration of a cross-sectional view for a passive alignment of passively compliant end-effector unit with a linearly misaligned workpiece depicted in accordance with an illustrative embodiment.

Turning next to FIG. 14, an illustration of a cross-sectional view for a passive alignment of passively compliant end-effector unit with a linearly misaligned workpiece is depicted in accordance with an illustrative embodiment. As depicted, end-effector 204, illustrated according to the cross-section view of FIG. 4, is passively aligned with workpiece feature 1302 of FIG. 13.

When actual location 1310 of workpiece 1104 substantially linearly deviates from the nominal location at which end-effector unit 204 is located, bearing housing 426 passively shifts from a substantially neutral position in order to comply with the misalignment of actual location 1304 of feature 1302. In this illustrative example, bearing housing 426 can be translated along either of x-axis 802 and y-axis 804 relative to main body 302.

Bearing housing 426 is magnetically coupled to the main body 302 by alignment magnets 430 and alignment magnets 432. As contactor 422 is inserted into workpiece feature 1302, alignment magnets 430 and alignment magnets 432 offset, allowing end-effector unit 204 to compensate for non-ideal location of workpiece features. Bearing housing 426 passively offsets relative to main body 302, allowing for linear movement of bearing housing 426 relative to main body 302, Linear gauge 418 of measurement probe 206 is coupled with bearing housing 426. Therefore, linear displacement of bearing housing 426 produces a corresponding offset of measurement probe 206.

Linear compliance of measurement probe 206 based on movement of bearing housing 426 relative to main body 302 compensates, in part, for linear misalignment of workpiece features enabling linear alignment of measurement probe 206 with the workpiece and workpiece feature. Linear compliance of measurement probe 206 enables the passive linear self-alignment of end-effector unit 204. Based in part on the passive self-alignment of measurement probe 206, end-effector unit 204 can accurately perform operations on workpiece feature 1302.

Turning next to FIGS. 15-22, a series of illustrations of cross-sectional orthographic projection views for a passively compliant end-effector performing an operation is depicted in accordance with an illustrative embodiment. As depicted, end-effector unit 204 is illustrated performing an operation on workpiece 1500. In this illustrative example, the operation is a measurement of thickness 1506 of workpiece 1504 at workpiece feature 1502. In this illustrative example, workpiece feature 1502 is hole 1508.

Figure 15:
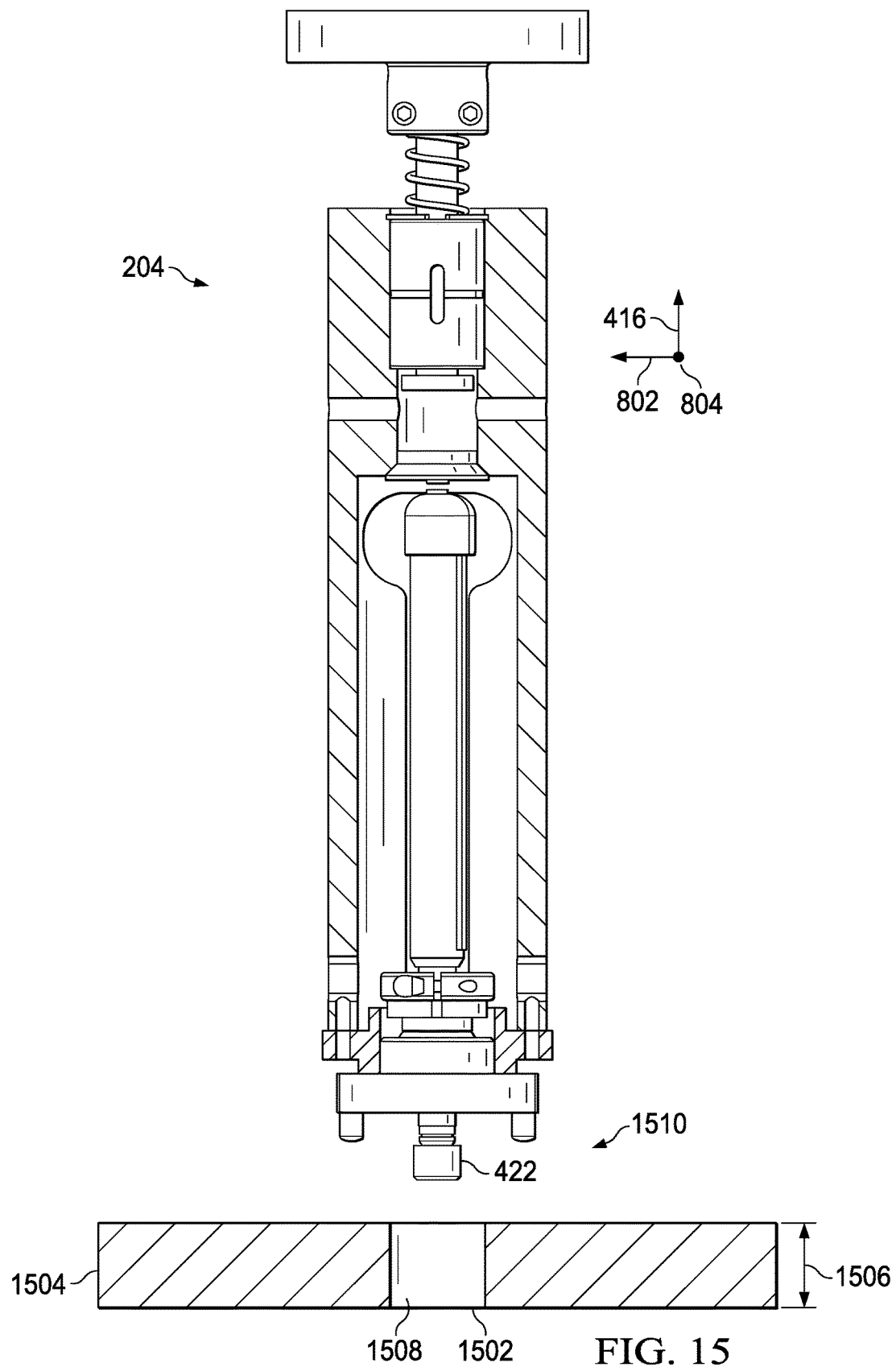
FIG. 15 is a first illustration in a series of cross-sectional views for a passively compliant end-effector performing an operation depicted in accordance with an illustrative embodiment.

Referring now specifically to FIG. 15, end-effector unit 204 is positioned at approach location 1510 by robot 202 of FIG. 2 according to robot controller 106, shown in block form in FIG. 1. Approach location 1510 is a location slightly above the nominal location for hole 1508. Approach location 1510 is positioned at a height above workpiece 1504 such that contactor 422 can extend into hole 1508 without hitting workpiece 1504.

Figure 16:
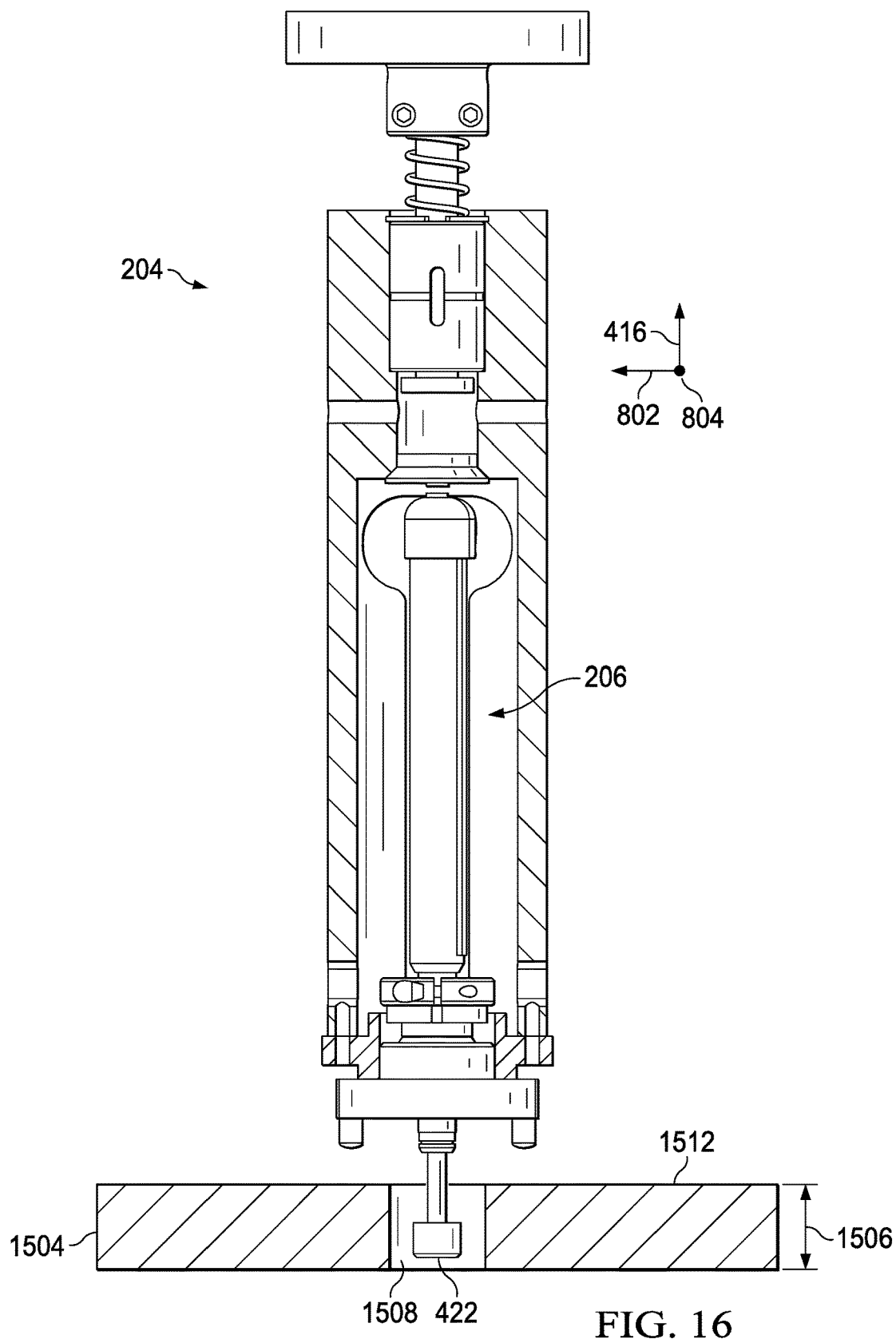
FIG. 16 is a second illustration in a series of cross-sectional views for a passively compliant end-effector performing an operation depicted in accordance with an illustrative embodiment.

Referring now specifically to FIG. 16, end-effector unit 204 is shown in close proximity to, but not in contact with workpiece 1504. When robot controller 106, shown in block form FIG. 1, is finished moving end-effector unit 204, data acquisition controller 108, shown in block form in FIG. 1, extends the contactor 422 of measurement probe 206 to check for contact with surface 1512 of workpiece 1504. When contactor 422 of measurement probe 206 is fully extended, data acquisition controller 108 shown in block form in FIG. 1 assumes that measurement probe 206 has extended into hole 1508.

Figure 24:
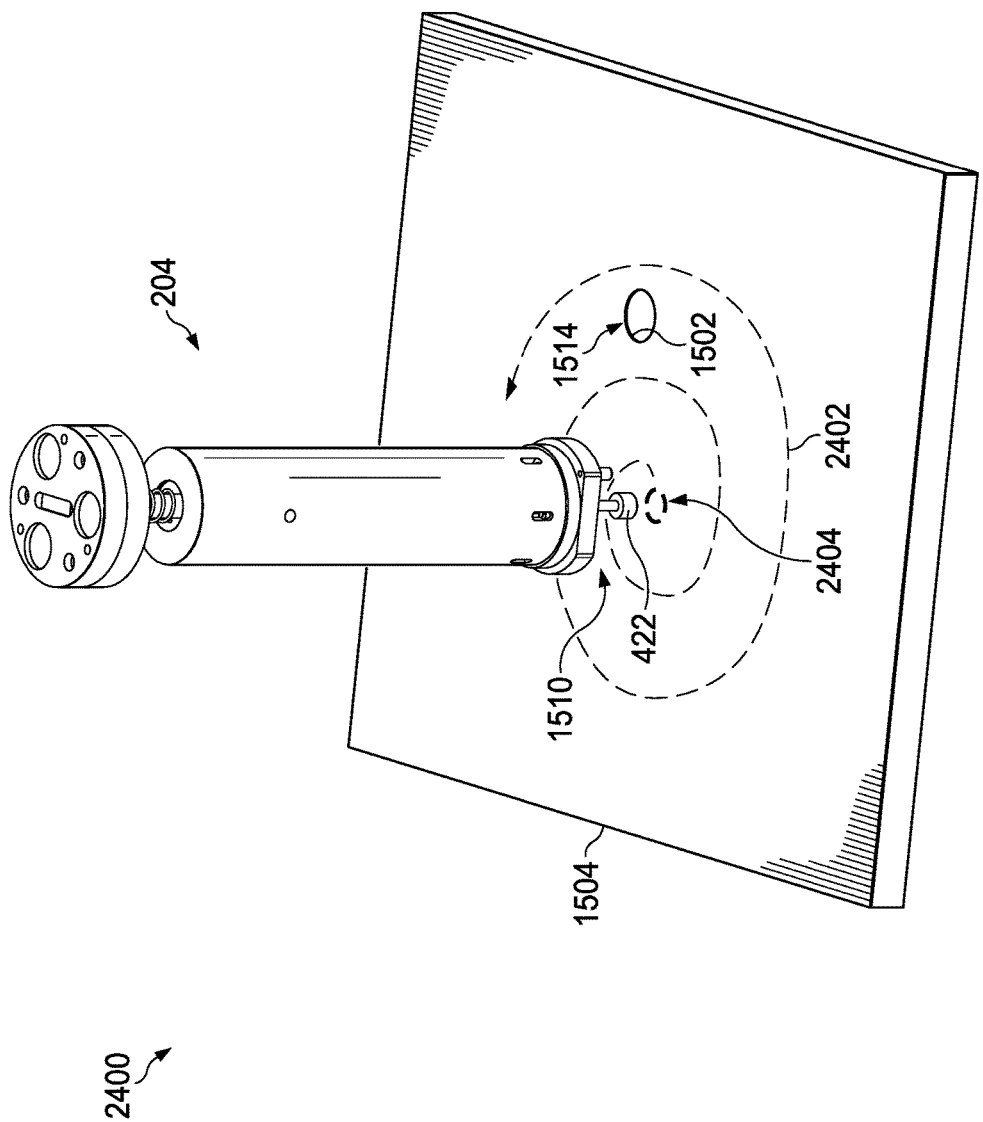
FIG. 24 is in illustration of a orthographic projection view for performing an extension search process depicted in accordance with an illustrative embodiment.

If measurement probe 206 cannot fully extend, data acquisition controller 108 assumes that contactor 422 has contacted surface 1512. Application controller 114, shown in block form in FIG. 1, then proceeds to large misalignment mitigation process, as illustrated in FIG. 24 below.

Figure 17:
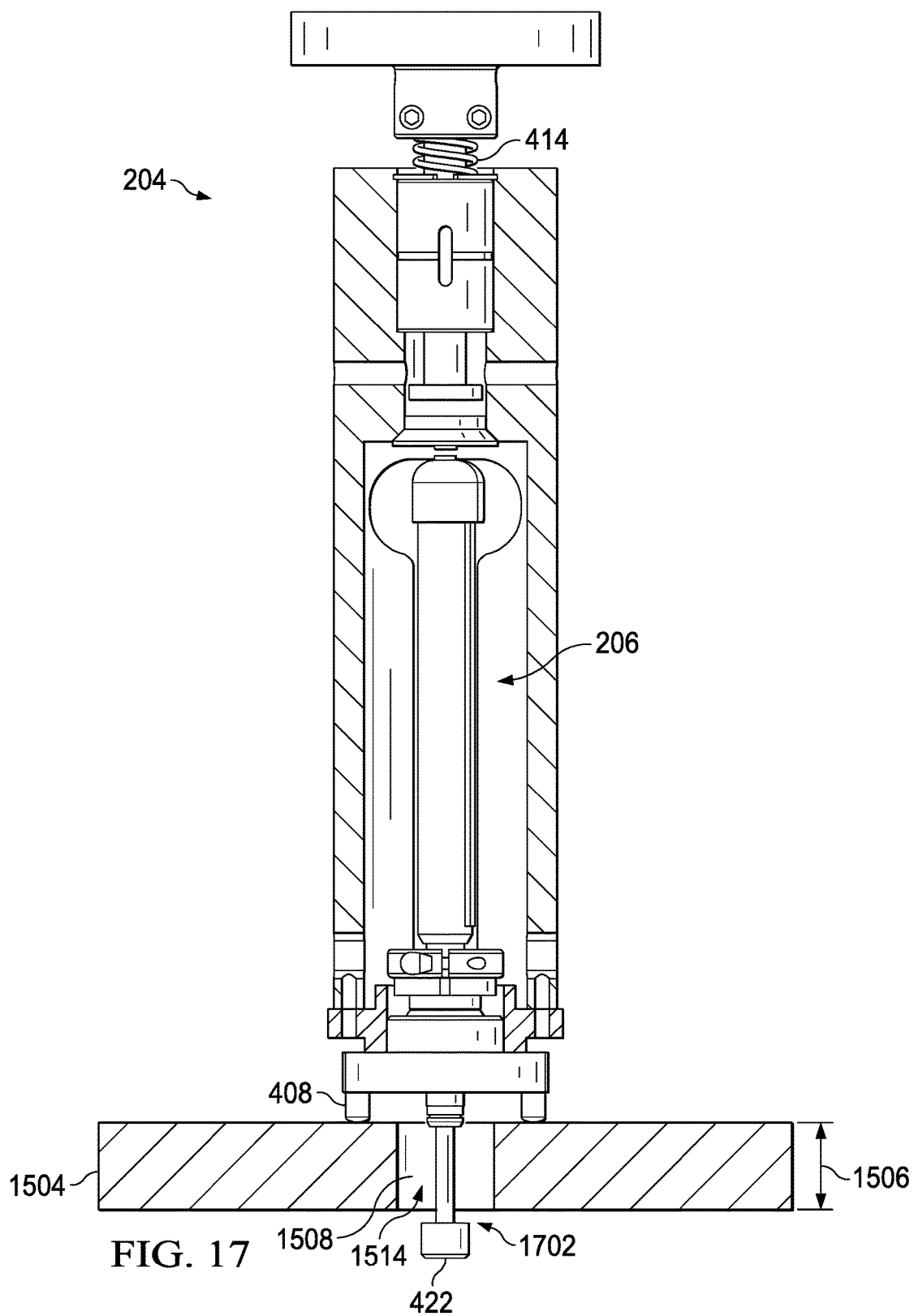
FIG. 17 is a third illustration in a series of cross-sectional views for a passively compliant end-effector performing an operation depicted in accordance with an illustrative embodiment.

Referring now specifically to FIG. 17, end-effector unit 204 is moved by robot 102, shown in block form in FIG. 1 so that contactor 422 moves down through the center of the hole 1508 to measurement depth 1702.

In this illustrative example, vertical compliance of end-effector unit 204 prevents damage to workpiece 1504 and end-effector unit 204. The vertical compliance can be provided by, for example, compression of spring 414.

As contactor 422 is moved into hole 1508, measurement probe 206 is passively aligned orientationally with actual location 1514 of hole 1508. In this illustrative example, measurement probe 206 is passively aligned with actual location 1514 of hole 1508 as described with respect to FIGS. 11-14 above.

Figure 18:
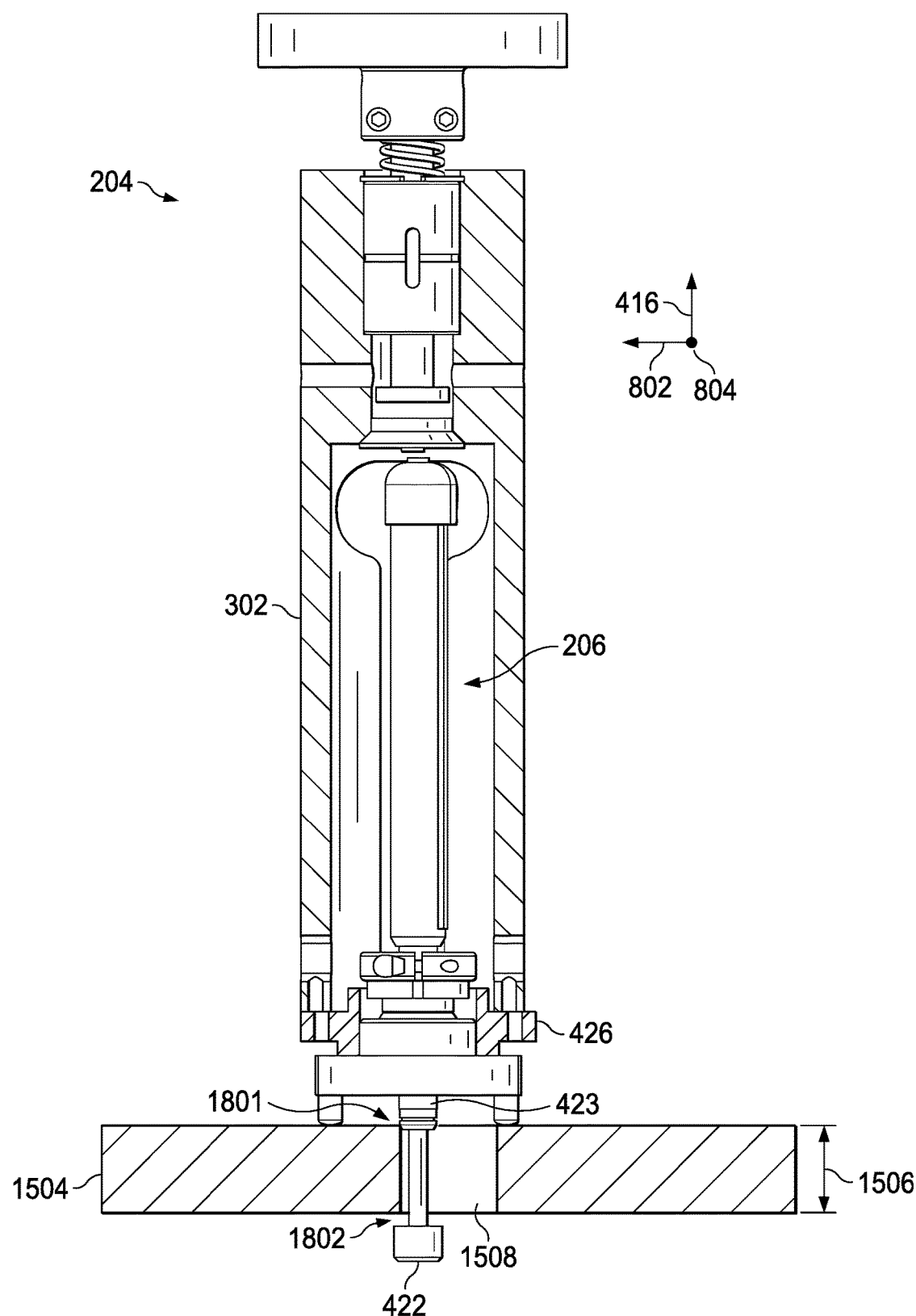
FIG. 18 is a fourth illustration in a series of cross-sectional views for a passively compliant end-effector performing an operation depicted in accordance with an illustrative embodiment.

Referring now specifically to FIG. 18, after measurement probe 206 has been moved into and passively aligned with hole 1508, end-effector 204 is moved to measurement location 1802. In this illustrative example, measurement location 1802 is a location around the circumference of hole 1508 at which thickness 1506 of workpiece 1504 is to be determined. To reach measurement location 1802, robot controller 106, shown in block form in FIG. 1, directs robot 202 of FIG. 2 to move end-effector unit 204 in a direction along at least one of x-axis 802 and y-axis 804, until measurement probe 110 contacts workpiece 1504 at the measurement location 1802.

In an illustrative example, compliant elements, described above with respect to FIGS. 8-11 above, shift to take up overrun of measurement location 1802. As described above with respect to FIGS. 8-11 above, when end-effector unit 204 overruns measurement location 1802, bearing housing 426 passively shifts relative to main body 302 in order to compensate for overrun of measurement location 1802 by end-effector unit 204. A contact signal from barrel probe 423 will be sent to the robot controller 106 to indicate that it should stop moving. Even though the robot is receiving a single that contact has occurred, it will take a fraction of a second for the robot to come to a stop. The passive X,Y compliance of the end effector will provide compliant compensation for this motion. As illustrated in FIG. 18, bearing housing 426 is translated relative to main body 302 along either of x-axis 802 and y-axis 804 or both.

Figure 19:
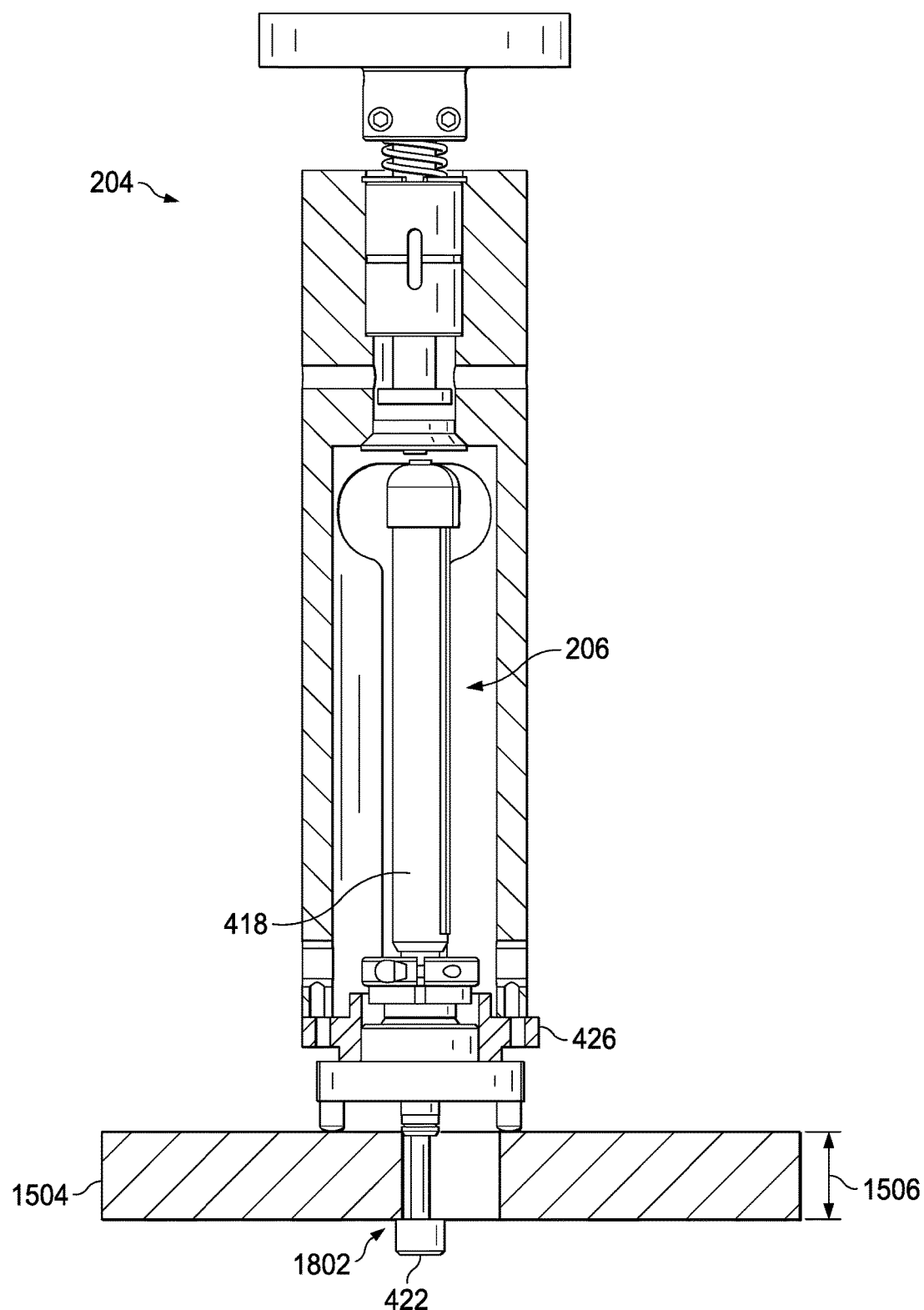
FIG. 19 is a fifth illustration in a series of cross-sectional views for a passively compliant end-effector performing an operation depicted in accordance with an illustrative embodiment.

Referring now specifically to FIG. 19, end-effector unit 204 has been moved into measurement location 1802. Once end-effector unit 204 is in measurement location 1802, data acquisition controller 108, shown in block form in FIG. 1, directs measurement probe 206 to perform the measurement operation. As illustrated, measurement probe 206 retracts until contactor 422 contacts workpiece 1504. Data acquisition controller 108, shown in block form in FIG. 1, identifies an extension of linear gauge 418, from which thickness 1506 of workpiece 1504 at measurement location 1802 can be determined.

Figure 20:
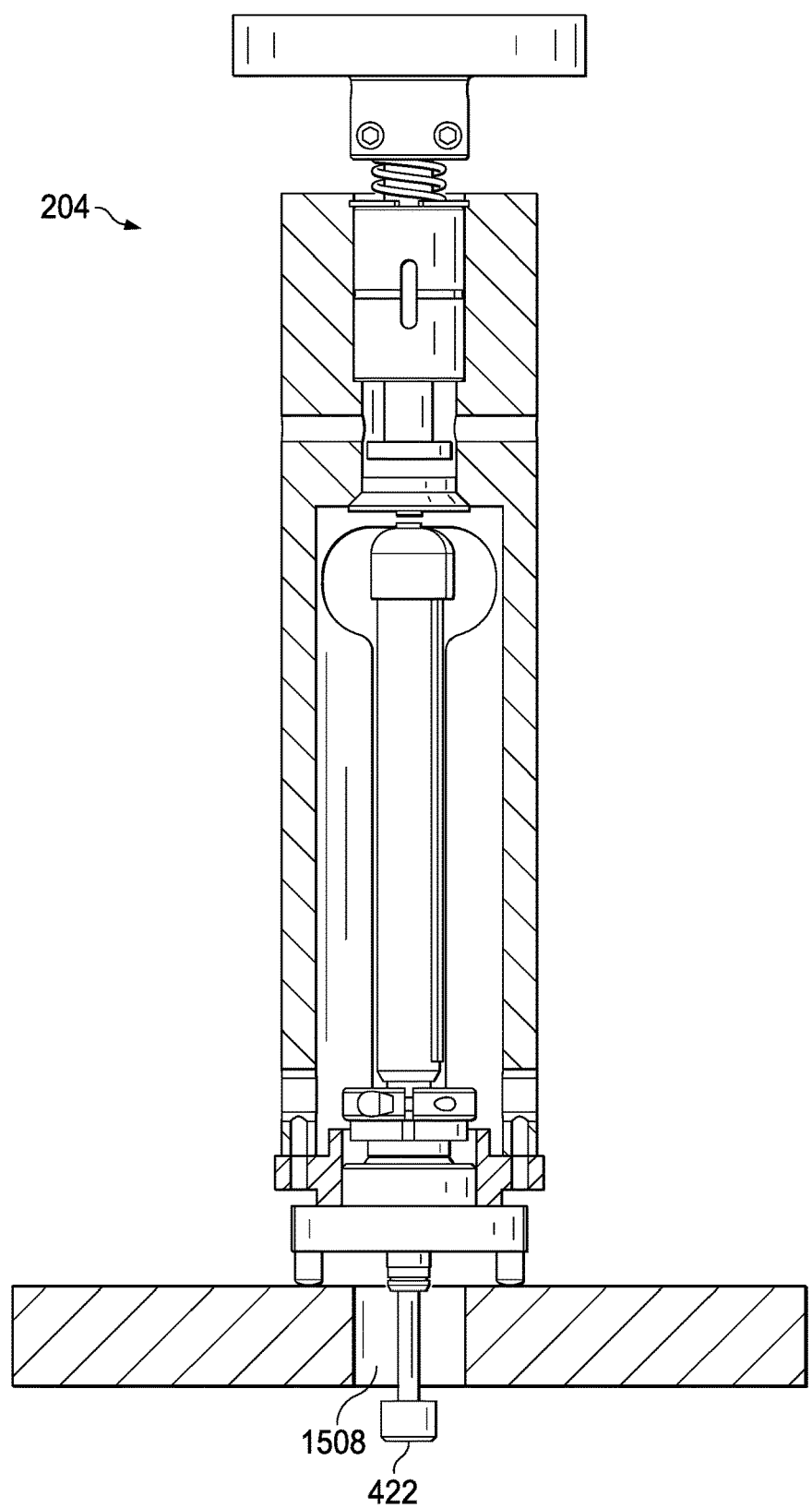
FIG. 20 is a sixth illustration in a series of cross-sectional views for a passively compliant end-effector performing an operation depicted in accordance with an illustrative embodiment.

Referring now to FIG. 20, contactor 422 is illustrated as extended, and end-effector unit 204 has returned to the nominal center of hole 1508. When the an individual measurement is complete, robot controller 106, shown in block form in FIG. 1, can then move end-effector unit 204 to perform additional measurements to different measurement locations around hole 1508. After completing measurement process for each measurement location around hole 1508, end-effector unit 204 returns to the nominal center of hole 1508.

Figure 21:
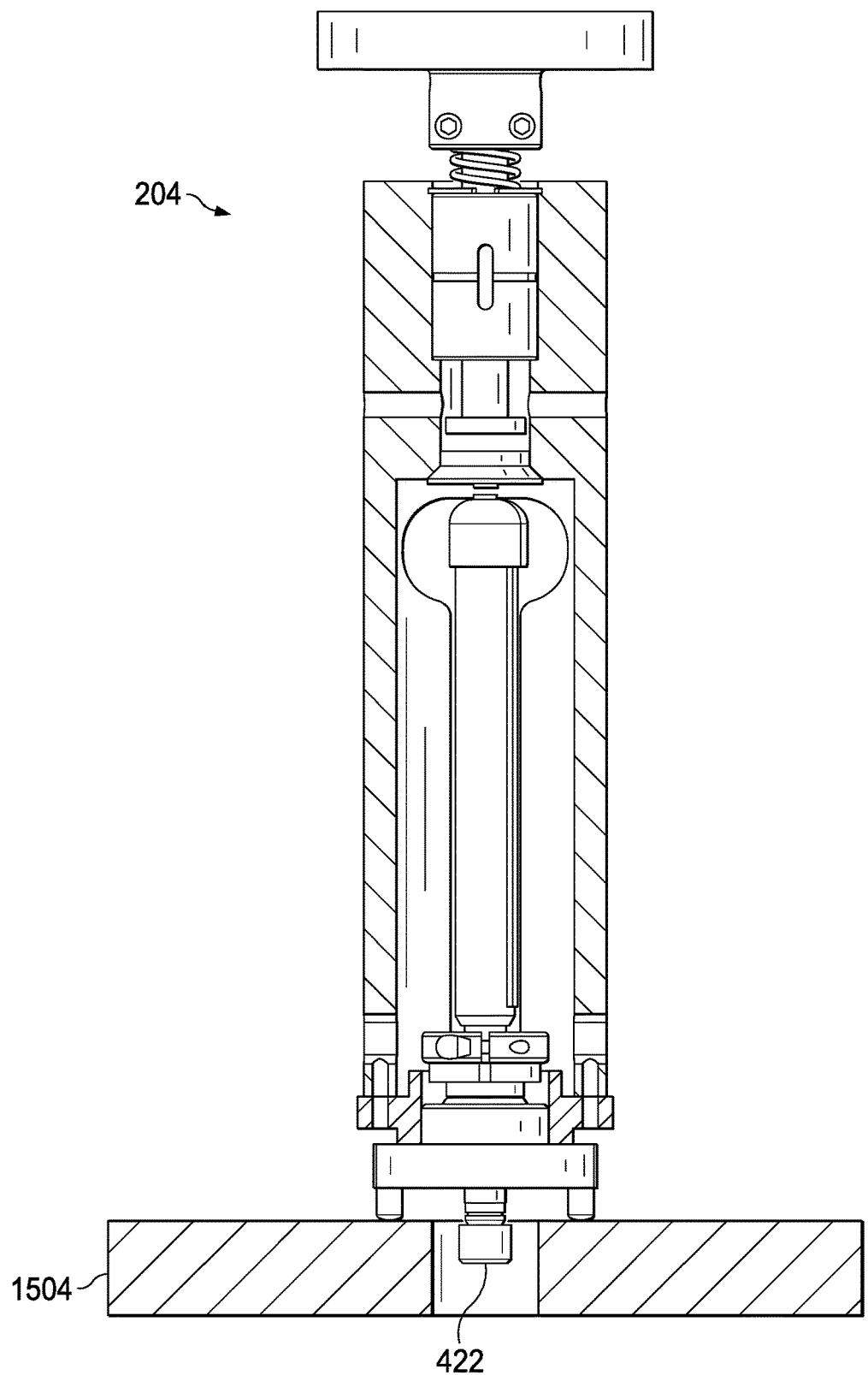
FIG. 21 is a seventh illustration in a series of cross-sectional views for a passively compliant end-effector performing an operation depicted in accordance with an illustrative embodiment.

Referring now to FIG. 21, contactor 422 is retracted. When robot controller 106, shown in block form in FIG. 1, is finished moving end-effector unit 204, data acquisition controller 108, shown in block form in FIG. 1, retracts contactor 422 and checks the probe extension distance to determine if full retraction has occurred or if the contactor 422 has contacted the workpiece 1504.

Figure 25:
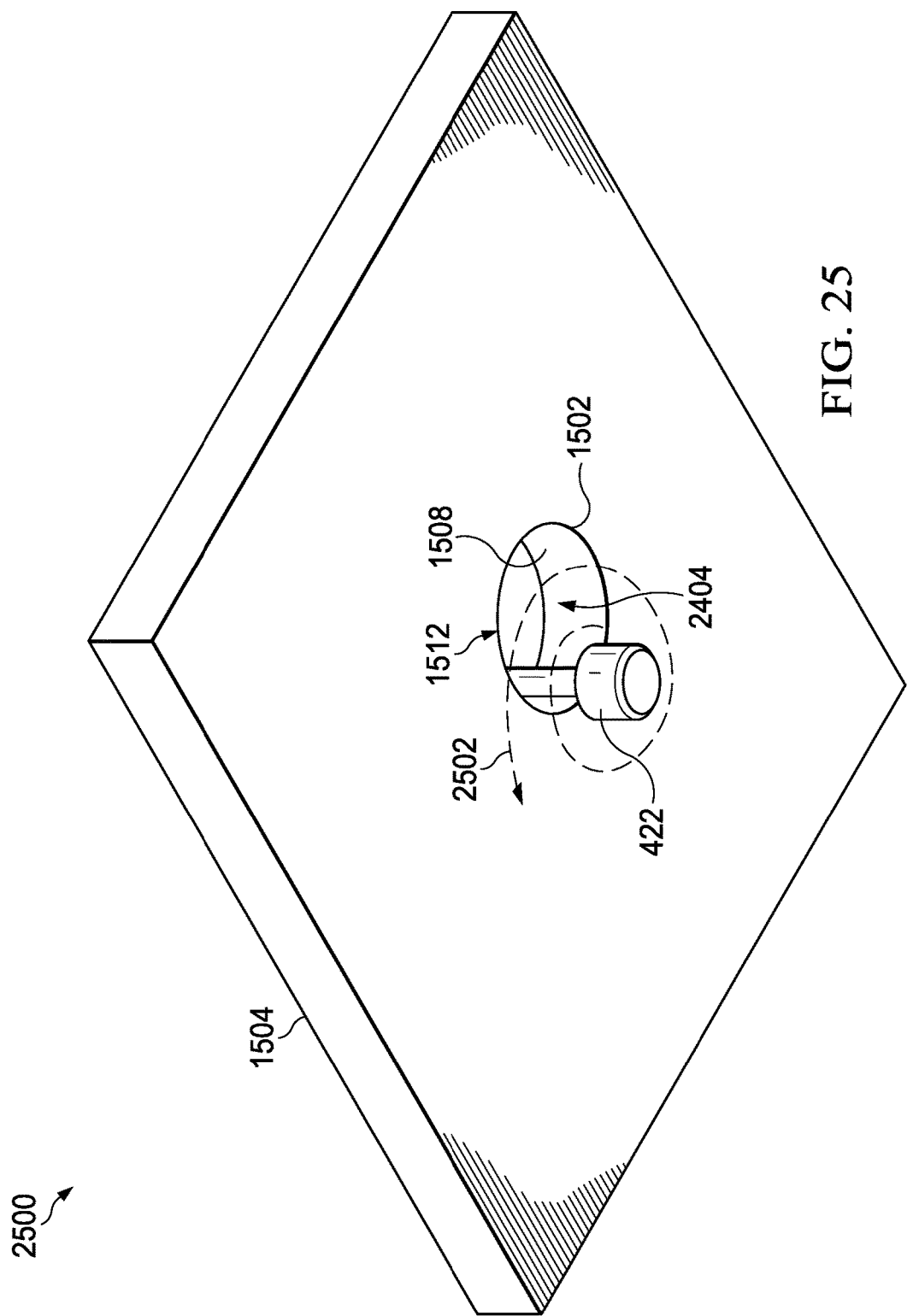
FIG. 25 is an illustration of an orthographic projection view for performing a retraction clearance search process depicted in accordance with an illustrative embodiment.

If contactor 422 cannot fully retract, contactor 422 has contacted workpiece 1504 during retraction. Application controller 114, shown in block form in FIG. 1, proceeds to large misalignment mitigation process, as illustrated in FIG. 25 below.

Figure 22:
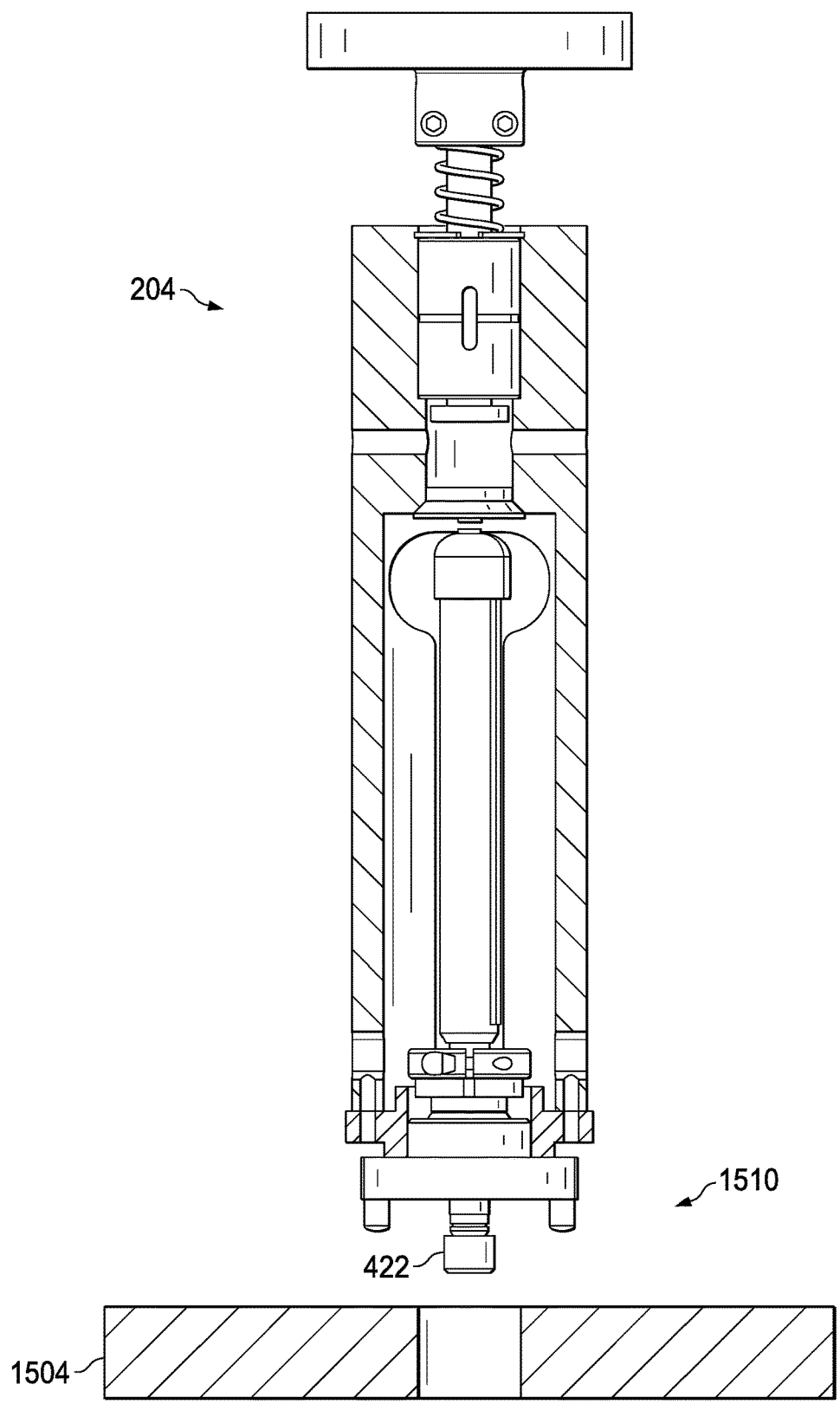
FIG. 22 is an eighth illustration in a series of cross-sectional views for a passively compliant end-effector performing an operation depicted in accordance with an illustrative embodiment.

Referring now to FIG. 22, end-effector unit 204 is shown having returned to approach location 1510. When clearance of contactor 422 has been confirmed, robot controller 106, shown in block form in FIG. 1, moves end-effector unit 204 away from workpiece 1504 back to approach location 1510. Robot controller 106, shown in block form in FIG. 1, can then move end-effector unit 204 to a subsequent approach location above another workpiece feature and perform operations thereon.

Figure 23:
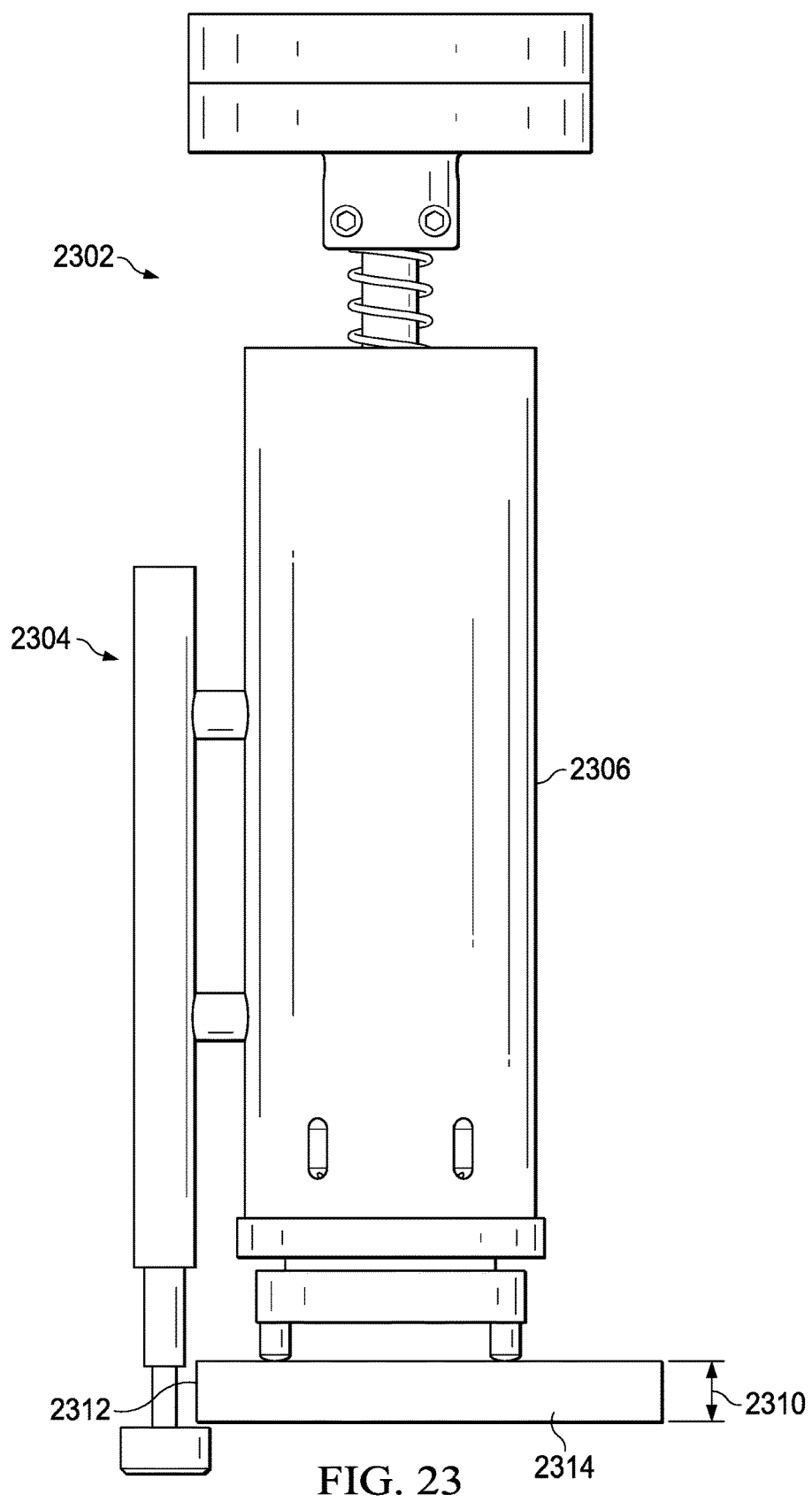
FIG. 23 is a two-dimensional illustration of an end-effector unit depicted in accordance with an illustrative embodiment.

Referring now to FIG. 23, a two-dimensional illustration of an end-effector unit is depicted in accordance with another illustrative embodiment. End-effector unit 2302 illustrated in FIG. 23 is a second example of a physical implementation for end-effector unit 104, shown in block form in FIG. 1.

As depicted, measurement probe 2304 is externally located from main body 2306. In this configuration, end-effector unit 2302 is configured to accurately perform a measurement operation of thickness 2310 along edge 2312 of workpiece 2314.

Referring now to FIG. 24, in illustration of a orthographic projection view for performing an extension search process is depicted in accordance with an illustrative embodiment. As depicted, extension search process 2400 is a large misalignment mitigation process for locating a workpiece feature when extension of contactor 422 is blocked by workpiece 1504 at approach location 1510.

As depicted, and effector unit 204 has been positioned at nominal location 2404 according to robot controller 106, shown in block form in FIG. 1. Nominal location 2404 corresponds to an expected location and orientation for workpiece 1504 and workpiece feature 1502. Nominal location 2404 can be based on a design or manufacturing specification for workpiece 1504. Nominal location 2404 can be stored as reference data within at least one of robot controller 106 and application controller 114, both shown in block form in FIG. 1.

In this illustrative example, nominal location 2404 of workpiece feature 1502 is substantially different from actual location 1514 of workpiece feature 1502, such that extension of contactor 422 is blocked by workpiece 1504.

When contact with workpiece 1504 is detected, application controller 114, shown in block form in FIG. 1, initiates extension search process 2400. During extension search process 2400, robot controller 106, shown in block form in FIG. 1, makes small incremental moves to end-effector unit 204 along outward spiral path 2402. After each incremental move, data acquisition controller 108, shown in block form in FIG. 1, extends contactor 422 to check for workpiece feature 1502. When workpiece feature 1502 is discovered, such as by clearance of contactor 422 into hole 1508, application controller 114 stores the deviation from nominal location 2404 as off-set data, and continue measurement process, as illustrated in FIGS. 15-22.

Referring now to FIG. 25, an illustration of an orthographic projection view for performing a retraction clearance search process is depicted in accordance with an illustrative embodiment. As depicted, retraction clearance search process 2500 is a large misalignment mitigation process for locating a position at which end-effector unit 204 can be safely retracted from workpiece 1504 when retraction of contactor 422 is blocked by workpiece 1504.

As depicted, end-effector unit 204 has moved to nominal location 2404. In this illustrative example, nominal location 2404 is a center position of hole 1508. When contact with workpiece 1504 is detected, application controller 114, shown in block form in FIG. 1, initiates retraction clearance search process 2500. During retraction clearance search process 2500, robot controller 106, shown in block form in FIG. 1, makes small incremental moves to end-effector unit 204 along outward spiral path 2502. In an illustrative example, outward spiral path 2502 is in outward spiral path from nominal location 2404 that starts in a direction opposite of a last measurement location, such as measurement location 1802 of FIG. 18. After each incremental move, data acquisition controller 108, shown in block form in FIG. 1, attempts to retract contactor 422 to check for clearance from workpiece feature 1502. When clearance from workpiece feature 1502 is discovered, such as when retraction of contactor 422 does not contact workpiece 1504, robot controller 106 retracts end-effector unit 204 to approach location 1510, as illustrated in FIG. 15.

Figure 26:
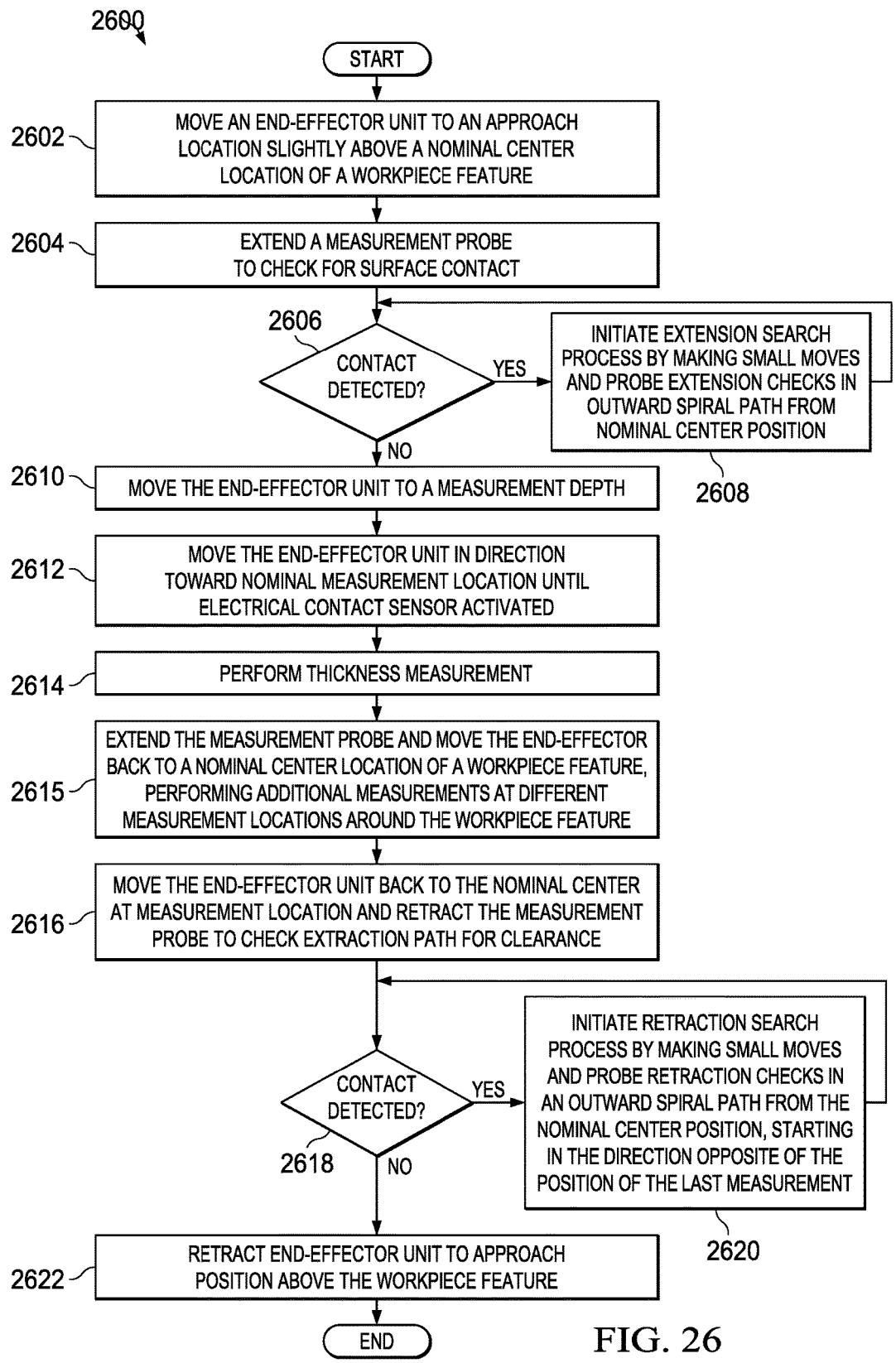
FIG. 26 is an illustration of a process for performing thickness measurement operation at a workpiece feature using a passively compliant end-effector depicted in accordance with an illustrative embodiment.

With reference now to FIG. 26, an illustration of a process for performing thickness measurement operation at a workpiece feature using a passively compliant end-effector is depicted in accordance with an illustrative embodiment. The process illustrated in FIG. 26 may be implemented in one or more of robot controller 106, data acquisition controller 108, and application controller 114, all shown in block form in FIG. 1.

Process 2600 begins by moving an end-effector unit to an approach location (step 2602). The end-effector unit can be, for example, end-effector unit 204 of FIG. 2. The approach location is a location slightly above a nominal center location of a workpiece feature on which the operation is to be performed. The workpiece feature can be, for example, hole 1202 illustrated in FIGS. 12 and 13. The approach location can be, for example, approach location 1510 illustrated in FIG. 15.

After moving to the approach location, process 2600 extends a measurement probe to check for surface contact (step 2604). If an contact with the surface is detected ("yes" at step 2606), process 2600 initiates extension search process by making small moves and probe extension checks in an outward spiral path from the nominal center position (step 2608). The extension search process can be, for example, extension search process 2400 illustrated in FIG. 24.

Returning now to step 2606, if a contact with the surface is not detected ("no" at step 2606), process 2600 moves the end-effector unit to measurement depth (step 2610). The measurement depth can be, for example, measurement depth 1702 illustrated in FIG. 17.

As the end-effector unit is moved to measurement depth, a measurement probe, such as measurement probe 206 of FIG. 2, is passively aligned orientationally with the actual location the workpiece feature. In this illustrative example, process 2600 passively aligns end-effector unit 204 with actual location 1514 of hole 1508 as described with respect to FIGS. 11-14 above.

Process 2600 and moves the end-effector in direction toward nominal measurement location until electrical contact sensor activated (step 2612). In this illustrative example, the end-effector unit is moved to a measurement location, such as measurement location 1802 illustrated in FIG. 18.

When the end-effector unit has reached the measurement location, process 2600 performs a thickness measurement (step 2614). In this illustrative example, process 2600 retracts the measurement probe until a contactor, such as contactor 422, contacts the workpiece. Based on the position of the contactor, process 2600 can determine the thickness of the workpiece the measurement location. In this illustrative example, the contactor is associated with a linear gauge, such as linear gauge 418 of FIG. 4. Process 2600 determines the thickness of the workpiece by measuring the extension of the linear gauge when the contactor is in contact with the workpiece.

After performing the measurement operation, process 2600 extends the measurement probe and moves the end-effector back to a nominal center location of a workpiece feature (step 2615). Robot controller 106, shown in block form in FIG. 1, can then move end-effector unit 204 to perform additional measurements at different measurement locations around the workpiece feature.

When all measurements are completed, the measurement probe is retracted to check for probe clearance from the workpiece (step 2616). If an contact with the workpiece is detected ("yes" at step 2618), process 2600 initiates retraction search process by making small moves and probe extension checks in and outward spiral path from the nominal center position, starting in a direction opposite of the position of the last measurement (step 2620). The retraction search process can be, for example, retraction search process 2500 illustrated in FIG. 25.

Returning now to step 2618, if contact with the workpiece is not detected ("no" at step 2618), process 2600 retracts the end-effector unit to the approach location above the workpiece feature (step 2622), with the process terminating thereafter. When the contactor does not contact the workpiece on retraction, clearance of the measurement probe from the workpiece feature is confirmed. After retracting the end-effector to the approach location, a robot controller, such as robot controller 106 of FIG. 1, can move the end-effector unit to a subsequent approach point above a subsequent workpiece feature and perform operations thereon.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Therefore, the illustrative embodiments described herein provide a solution that incorporates three-dimensional compliance and sensor feedback to allow real-time adaptation to robotic end-effector-to-feature misalignment that occurs in large scale robotics applications. Furthermore, the data acquisition system of the illustrative embodiments also eliminates the human intervention needed to address misalignment. The illustrative embodiments described herein therefore provide an ability to adjust for manufacturing variations in the parts or expansion/contraction due to variation in environmental factors (like temperature) in a manner that standard robotic systems designed to perform in an open-loop, deterministic way, do not have.

When compared vision systems, the illustrative embodiments described herein are simpler to implement and not susceptible to variations in lighting conditions. The data acquisition system of the illustrative embodiments does not rely on cameras or other optical hardware required by vision systems. Therefore, the resulting implementation has lower initial investment cost and lower on-going maintenance costs.

When compared to coordinate measuring machines, the illustrative embodiments described uses a comparatively low cost robot arm for positioning. Furthermore, the illustrative embodiments do not require the large amounts of dedicated floor space to implement a coordinate measuring machine, especially when measurement of large or complex parts is required.

Figure 27:
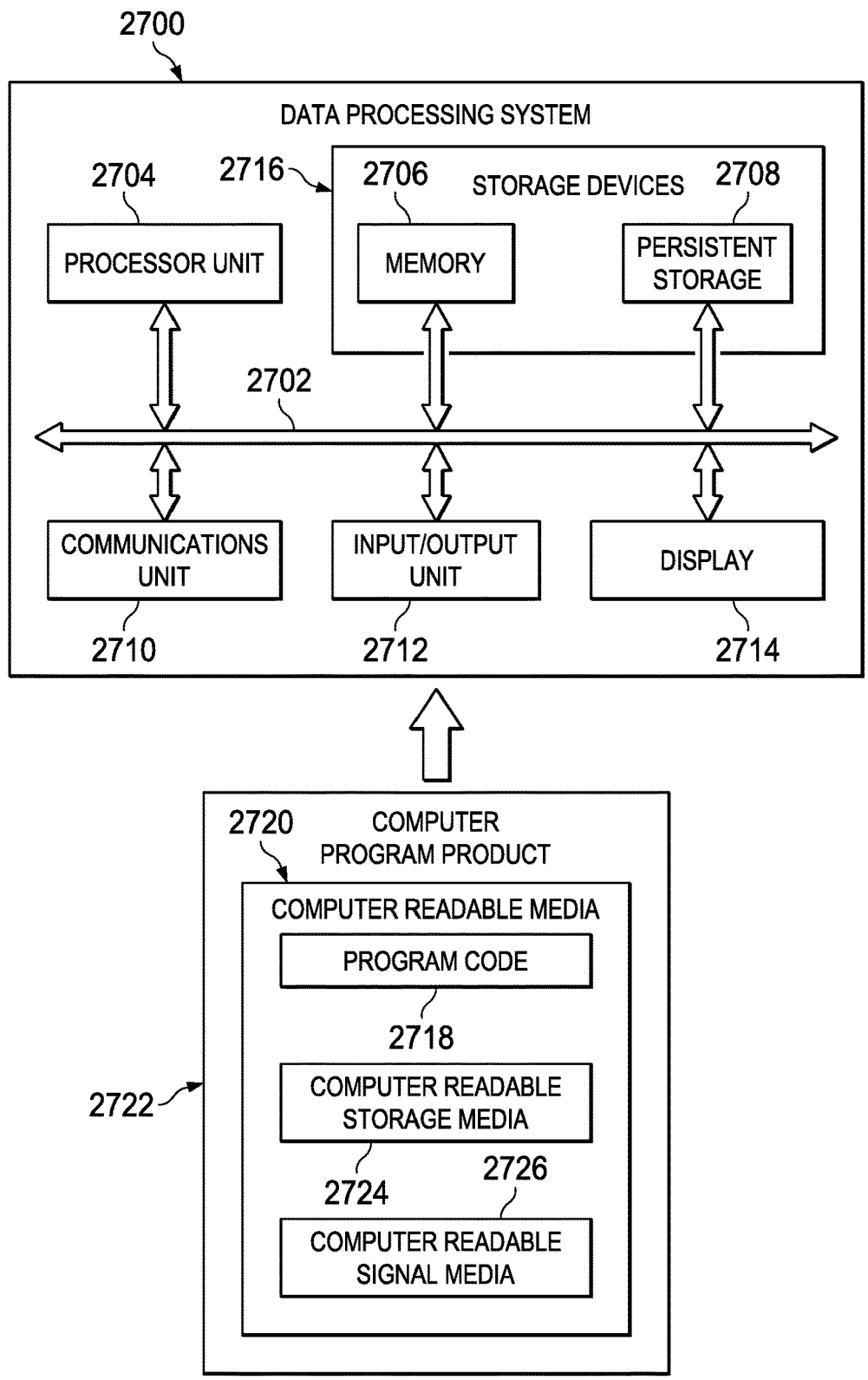
FIG. 27 is an illustration of a data processing system in the form of a block diagram depicted in accordance with an illustrative embodiment.

Turning now to FIG. 27, an illustration of a data processing system in the form of a block diagram is depicted in accordance with an illustrative embodiment. Data processing system 2700 may be used to implement one or more of robot controller 106, data acquisition controller 108, and application controller 114, all shown in block form in FIG. 1. As depicted, data processing system 2700 includes communications framework 2702, which provides communications between processor unit 2704, storage devices 2706, communications unit 2708, input/output unit 2710, and display 2712. In some cases, communications framework 2702 may be implemented as a bus system.

Processor unit 2704 is configured to execute instructions for software to perform a number of operations. Processor unit 2704 may comprise a number of processors, a multiprocessor core, and/or some other type of processor, depending on the implementation. In some cases, processor unit 2704 may take the form of a hardware unit, such as a circuit system, an application specific integrated circuit (ASIC), a programmable logic device, or some other suitable type of hardware unit.

Instructions for the operating system, applications, and/or programs run by processor unit 2704 may be located in storage devices 2706. Storage devices 2706 may be in communication with processor unit 2704 through communications framework 2702. As used herein, a storage device, also referred to as a computer readable storage device, is any piece of hardware capable of storing information on a temporary and/or permanent basis. This information may include, but is not limited to, data, program code, and/or other information.

Memory 2714 and persistent storage 2716 are examples of storage devices 2706. Memory 2714 may take the form of, for example, a random access memory or some type of volatile or non-volatile storage device. Persistent storage 2716 may comprise any number of components or devices. For example, persistent storage 2716 may comprise a hard drive, a flash memory, a rewritable optical disk, a rewritable magnetic tape, or some combination of the above. The media used by persistent storage 2716 may or may not be removable.

Communications unit 2708 allows data processing system 2700 to communicate with other data processing systems and/or devices. Communications unit 2708 may provide communications using physical and/or wireless communications links.

Input/output unit 2710 allows input to be received from and output to be sent to other devices connected to data processing system 2700. For example, input/output unit 2710 may allow user input to be received through a keyboard, a mouse, and/or some other type of input device. As another example, input/output unit 2710 may allow output to be sent to a printer connected to data processing system 2700.

Display 2712 is configured to display information to a user. Display 2712 may comprise, for example, without limitation, a monitor, a touch screen, a laser display, a holographic display, a virtual display device, and/or some other type of display device.

In this illustrative example, the processes of the different illustrative embodiments may be performed by processor unit 2704 using computer-implemented instructions. These instructions may be referred to as program code, computer usable program code, or computer readable program code and may be read and executed by one or more processors in processor unit 2704.

In these examples, program code 2718 is located in a functional form on computer readable media 2720, which is selectively removable, and may be loaded onto or transferred to data processing system 2700 for execution by processor unit 2704. Program code 2718 and computer readable media 2720 together form computer program product 2722. In this illustrative example, computer readable media 2720 may be computer readable storage media 2724 or computer readable signal media 2726.

Computer readable storage media 2724 is a physical or tangible storage device used to store program code 2718 rather than a medium that propagates or transmits program code 2718. Computer readable storage media 2724 may be, for example, without limitation, an optical or magnetic disk or a persistent storage device that is connected to data processing system 2700.

Alternatively, program code 2718 may be transferred to data processing system 2700 using computer readable signal media 2726. Computer readable signal media 2726 may be, for example, a propagated data signal containing program code 2718. This data signal may be an electromagnetic signal, an optical signal, and/or some other type of signal that can be transmitted over physical and/or wireless communications links.

The illustration of data processing system 2700 in FIG. 27 is not meant to provide architectural limitations to the manner in which the illustrative embodiments may be implemented. The different illustrative embodiments may be implemented in a data processing system that includes components in addition to or in place of those illustrated for data processing system 2700. Further, components shown in FIG. 27 may be varied from the illustrative examples shown.

Figure 28:
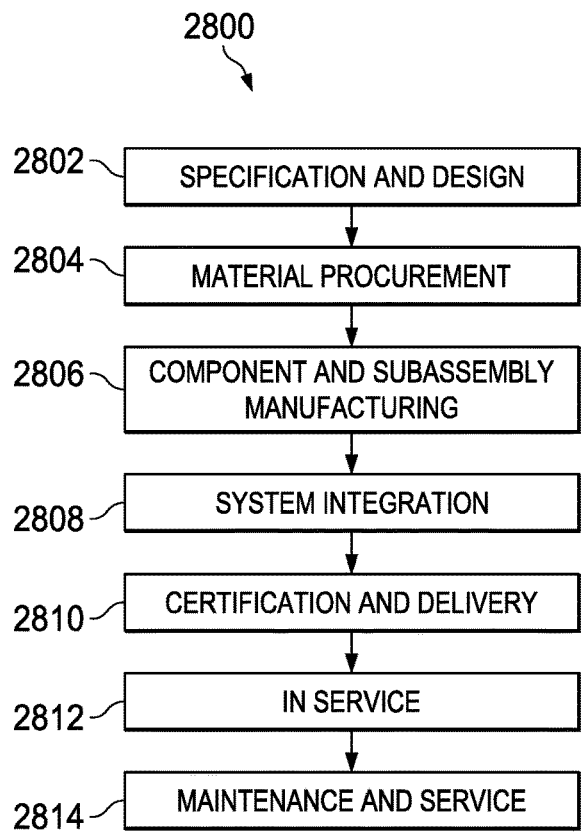
FIG. 28 is an illustration of a block diagram of an aircraft manufacturing and service method depicted in accordance with an illustrative embodiment.
Figure 29:
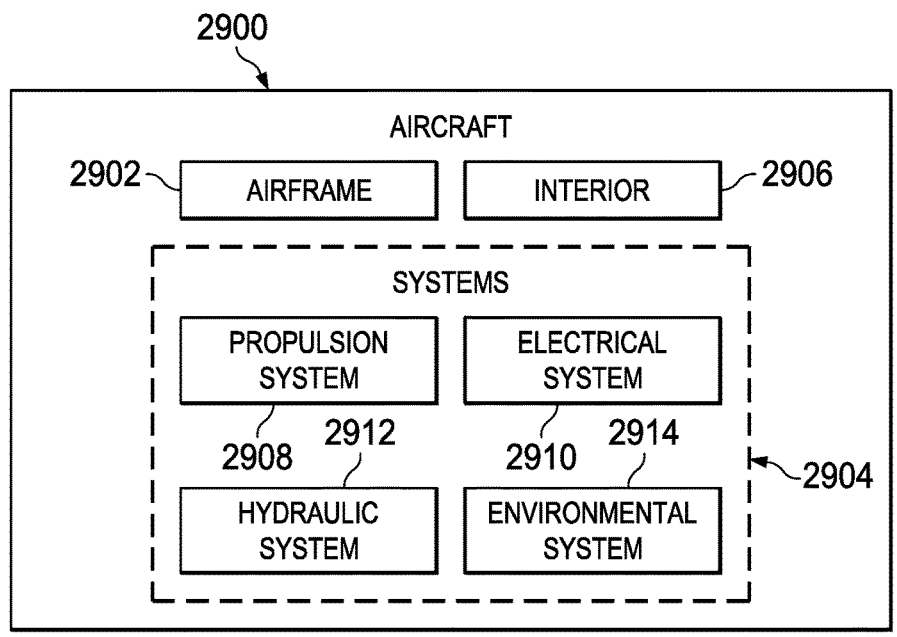
FIG. 29 is an illustration of a block diagram of an aircraft, in which an illustrative embodiment may be implemented.

Illustrative embodiments of the disclosure may be described in the context of aircraft manufacturing and service method 2800 as shown in FIG. 28 and aircraft 2900 as shown in FIG. 29. Turning first to FIG. 28, an illustration of a block diagram of an aircraft manufacturing and service method is depicted in accordance with an illustrative embodiment. During pre-production, aircraft manufacturing and service method 2800 may include specification and design 2802 of aircraft 2900 in FIG. 29 and material procurement 2804.

During production, component and subassembly manufacturing 2806 and system integration 2808 of aircraft 2900 in FIG. 29 takes place. Thereafter, aircraft 2900 in FIG. 29 may go through certification and delivery 2810 in order to be placed in service 2812. While in service 2812 by a customer, aircraft 2900 in FIG. 29 is scheduled for routine maintenance and service 2814, which may include modification, reconfiguration, refurbishment, and other maintenance or service.

Each of the processes of aircraft manufacturing and service method 2800 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of a block diagram of an aircraft is depicted in which an illustrative embodiment may be implemented. In this example, aircraft 2900 is produced by aircraft manufacturing and service method 2800 in FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2800 in FIG. 28. In particular, data acquisition system 100 from FIG. 1 may be used during various stages of aircraft manufacturing and service method 2800. For example, without limitation, end-effector unit 104 may be used to determine a thickness of airframe 2902 during specification and design 2802. Further, data acquisition system 100 may be used in inspection operations on airframe 2902 during routine maintenance and service 2814 or some other stage of aircraft manufacturing and service method 2800.

In one illustrative example, components or subassemblies produced in component and subassembly manufacturing 2806 in FIG. 28 may be fabricated or manufactured in a manner similar to components or subassemblies produced while aircraft 2900 is in service 2812 in FIG. 28. As yet another example, one or more apparatus embodiments, method embodiments, or a combination thereof may be utilized during production stages, such as component and subassembly manufacturing 2806 and system integration 2808 in FIG. 28. One or more apparatus embodiments, method embodiments, or a combination thereof may be utilized while aircraft 2900 is in service 2812, during maintenance and service 2814 in FIG. 28, or a combination thereof. The use of a number of the different illustrative embodiments may substantially expedite the assembly, reduce the cost of aircraft 2900, or both.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A multi-axis compliant end-effector for attachment to a robotic device, the end-effector comprising:
    a compliant contact probe configured to determine by contact an actual location of a workpiece feature; and
    at least one translational joint and at least one rotational joint associated with the compliant probe, the at least one translational joint and the at least one rotational joint configured to passively align the compliant contact probe with the workpiece feature.

2. The multi-axis compliant end-effector of claim 1, wherein the at least one translational joint further comprises:
    a bearing housing slidably secured a within foot collet of the end-effector.

3. The multi-axis compliant end-effector of claim 2, wherein the at least one rotational joint further comprises:
    a spherical bearing rotatably mounted in the bearing housing of the end-effector.

4. The multi-axis compliant end-effector of claim 3, wherein the compliant contact probe further comprises:
    a contactor configured to compliantly contact the workpiece, wherein the compliant contact probe is configured to provide feedback in response to contact between the contactor and the workpiece.

5. The multi-axis compliant end-effector of claim 4, further comprising:
    a linear gauge associated with the compliant contact probe, wherein a thickness of the workpiece at the workpiece feature is determined from the linear gauge when the contactor contacts the workpiece.

6. The multi-axis compliant end-effector of claim 5, wherein:
    the linear gauge is mounted within spherical bearing; and
    wherein the thickness of the workpiece at the workpiece feature is determined from the linear gauge when the contactor contacts an underside of the workpiece.

7. The multi-axis compliant end-effector of claim 1, further comprising:
    a number of magnetic detents configured to retain the compliant contact probe in a substantially neutral orientation when the compliant contact probe is not passively aligned with the workpiece feature.

8. The multi-axis compliant end-effector of claim 7, wherein:
    the number of magnetic detents are further configured to retain the compliant contact probe in a passively aligned orientation during data acquisition.

9. The multi-axis compliant end-effector of claim 1, further comprising:
    a kinematically aligned magnetic coupling for attaching the end-effector to the robotic device.

10. A method for automatically performing an operation on a workpiece using a multi-axis compliant end-effector for attachment to a robotic device, the method comprising:
    positioning the end-effector at a nominal location of a workpiece feature of the workpiece on which the operation is to be performed;
    contacting the end-effector with the workpiece feature to passively align the end-effector with the workpiece feature; and
    responsive to aligning the end effector with the workpiece feature, performing the operation on the workpiece feature.

11. The method of claim 10, further comprising:
    responsive to positioning the end-effector at the nominal location of the workpiece feature, determining whether the end-effector can be passively aligned with an actual location for the workpiece feature.

12. The method of claim 11, wherein determining whether the end-effector can be passively aligned with an actual location for the workpiece feature further comprises:
    extending a compliant contact probe from the end effector to determine whether the end-effector can be passively aligned with the actual location for the workpiece feature, wherein the contact probe is vertically compliant to prevent damage to the workpiece.

13. The method of claim 12, wherein the workpiece feature is a hole in the workpiece, and wherein passively aligning the end-effector with the workpiece feature further comprises:
    extending the contact probe through the hole; and
    translationally and angularly offsetting the contact probe from a magnetically defined neutral position as the contact probe is extended through the hole until the end-effector is aligned with the hole.

14. The method of claim 13, wherein the operation comprises determining a thickness of the workpiece at the hole, the method further comprising:
    retracting the contact probe until the compliant contact probe contacts an underside of the workpiece; and
    determining the thickness of the workpiece at the hole based on an extension of the contact probe.

15. The method of claim 14, further comprising:
    offsetting the end-effector until contact feedback from the compliant contact probe indicates contact with a sidewall of the hole,
    wherein the step of retracting the contact probe is performed in response to offsetting the end-effector.

16. The method of claim 14, further comprising:
    responsive to performing the operation, determining whether the compliant contact probe can be removed from the workpiece feature;
    responsive to determining that the contact probe cannot be removed from the workpiece feature, performing a retraction search process to locate a position of the end effector at which the contact probe can be retracted from the workpiece feature; and
    in response to locating the position of the end effector at which the contact probe can be retracted from the workpiece feature, retracting the end effector from the workpiece to feature from the workpiece feature to remove the compliant contact probe from the workpiece feature.

17. The method of claim 12, further comprising:
    responsive to determining that the nominal location for the workpiece feature is not the actual location for the workpiece feature, performing a search process for the workpiece feature; and responsive to locating the workpiece feature, storing an offset from the nominal location to the actual location for the workpiece feature.

18. The method of claim 17, wherein performing the search process for the workpiece feature further comprises:
making small moves of the end-effector and extension checks of the contact probe in an outward spiral path from the nominal location until the actual location for the workpiece feature is determined based on contact feedback from the compliant contact probe.

19. A computer program product for automatically performing an operation on a workpiece using a multi-axis compliant end-effector for attachment to a robotic device, the computer program product comprising:
A non-transitory computer readable storage media;
first program code, stored on the non-transitory computer readable storage media, for positioning the end-effector at a nominal location of a workpiece feature on which the operation is to be performed;
second program code, stored on the non-transitory computer readable storage media, for contacting the end-effector with the workpiece feature to passively align the end-effector with the workpiece feature; and
third program code, stored on the non-transitory computer readable storage media, for performing the operation on the workpiece feature in response to aligning the end effector with the workpiece feature.

20. The computer program product of claim 19, further comprising:
fourth program code, stored on the non-transitory computer readable storage media, for determining whether the end-effector can be passively aligned with an actual location for the workpiece feature in response to positioning the end-effector at the nominal location of the workpiece feature.

21. The computer program product of claim 20, wherein the fourth program code further comprises:
program code, stored on the non-transitory computer readable storage media, for extending a compliant contact probe from the end-effector to determine whether the end-effector can be passively aligned with an actual location for the workpiece feature.

22. The computer program product of claim 21, wherein the workpiece feature is a hole in the workpiece, wherein the second program code further comprises:
program code, stored on the non-transitory computer readable storage media, for extending the contact probe through the hole in the workpiece, wherein the contact probe is translationally and angularly passively offset from a magnetically defined neutral position as the contact probe is extended through the hole until the end-effector is aligned with the hole.

23. The computer program product of claim 22, wherein the operation comprises determining a thickness of the workpiece at the hole, the computer program product further comprising:
fifth program code, stored on the non-transitory computer readable storage media, for retracting the contact probe until the compliant contact probe contacts an underside of the workpiece; and sixth program code, stored on the non-transitory computer readable storage media, for determining the thickness of the workpiece at the hole based on an extension of the contact probe.

24. The computer program product of claim 23, further comprising:
seventh program code, stored on the non-transitory computer readable storage media, for offsetting the end-effector until contact feedback from the compliant contact probe indicates contact with a sidewall of the hole,
wherein the fifth program code is performed in response to the seventh program code.

25. The computer program product of claim 23, further comprising:
seventh program code, stored on the non-transitory computer readable storage media, for determining by contact feedback whether the compliant contact probe can be removed from the workpiece feature in response to performing the operation;
eighth program code, stored on the non-transitory computer readable storage media, for performing a retraction search process to locate a position of the end effector at which the contact probe can be retracted from the workpiece feature in response to determining that the contact probe cannot be removed from the workpiece feature; and
ninth program code, stored on the non-transitory computer readable storage media, for retracting the end effector from the workpiece to feature from the workpiece feature to remove the compliant contact probe from the workpiece feature in response to locating the position of the end effector at which the contact probe can be retracted from the workpiece feature.

26. The computer program product of claim 20, further comprising:
fifth program code, stored on the non-transitory computer readable storage media, for performing a search process for the workpiece feature in response to determining that the nominal location for the workpiece feature is not the actual location for the workpiece feature; and
sixth program code, stored on the non-transitory computer readable storage media, for storing an offset from the nominal location to the actual location for the workpiece feature responsive to locating by contact the workpiece feature.

27. The computer program product of claim 26, wherein the fifth program code further comprises:
program code, stored on the non-transitory computer readable storage media, for making small moves of the end-effector and extension checks of a contact probe in an outward spiral path from the nominal location until the actual location for the workpiece feature is determined based on contact feedback from the contact probe.

* * * * *